(12) United States Patent
Ishikawa et al.

(10) Patent No.: US 7,693,106 B1
(45) Date of Patent: Apr. 6, 2010

(54) NEIGHBORING BASE STATION INFORMATION UPDATE METHOD, INFORMATION MANAGEMENT METHOD FOR CELL SEARCH IN MOBILE COMMUNICATIONS SYSTEM, CELL SEARCH METHOD OF MOBILE STATION, MOBILE COMMUNICATIONS SYSTEM, MOBILE STATION, BASE STATION AND CONTROL STATION

(75) Inventors: Yoshihiro Ishikawa, Kanagawa (JP); Mamoru Sawahashi, Kanagawa (JP); Seizo Onoe, Kanagawa (JP)

(73) Assignee: NTT Docomo, Inc., Tokyo (JP)

( * ) Notice: Subject to any disclaimer, the term of this patent is extended or adjusted under 35 U.S.C. 154(b) by 1956 days.

(21) Appl. No.: 09/763,034

(22) PCT Filed: Jun. 14, 2000

(86) PCT No.: PCT/JP00/03868

§ 371 (c)(1),
(2), (4) Date: Feb. 15, 2001

(87) PCT Pub. No.: WO00/78083

PCT Pub. Date: Dec. 21, 2000

(30) Foreign Application Priority Data

Jun. 15, 1999 (JP) ................. 11-168899
Aug. 16, 1999 (JP) ................. 11-230103

(51) Int. Cl.
*H04W 4/00* (2009.01)
(52) U.S. Cl. ............... 370/331; 455/436
(58) Field of Classification Search ........... 370/335, 370/328, 331, 332, 333, 342, 441
See application file for complete search history.

(56) References Cited

U.S. PATENT DOCUMENTS

| 5,267,261 | A |   | 11/1993 | Blakeney, II et al. ........... 375/1 |
| 5,577,022 | A |   | 11/1996 | Pasovani et al. ............... 370/13 |
| 5,673,260 | A | * | 9/1997  | Umeda et al. ................ 370/342 |
| 5,953,326 | A | * | 9/1999  | Nakamura et al. .......... 370/335 |
| 5,983,113 | A | * | 11/1999 | Asanuma ..................... 455/506 |

(Continued)

FOREIGN PATENT DOCUMENTS

CN          1152247 A       6/1997

(Continued)

OTHER PUBLICATIONS

3G TS 25.211; V3.2.0 (Mar. 2000); 3rd Generation Partnership Project; Technical Specification Group Radio Access Network; Physical channels and mapping of transport channels onto physical channels (FDD) (Release 1999) pp. 1-40, Mar. 2000.

(Continued)

*Primary Examiner*—Phirin Sam
(74) *Attorney, Agent, or Firm*—Workman Nydegger

(57) ABSTRACT

A base station captures phase difference information between a long period spreading code of a common control channel of the base station and a long period spreading code of a common control channel of a neighboring base station of the base station from a mobile station. The base station transmits the phase difference information to a mobile station. The mobile station carries out cell search in accordance with the received phase difference information.

14 Claims, 18 Drawing Sheets

U.S. PATENT DOCUMENTS

| | | | | |
|---|---|---|---|---|
| 6,044,104 | A * | 3/2000 | Watanabe | 375/142 |
| 6,128,288 | A * | 10/2000 | Miya | 370/335 |
| 6,167,037 | A * | 12/2000 | Higuchi et al. | 370/335 |
| 6,246,673 | B1 | 6/2001 | Tiedemann et al. | 370/333 |
| 6,259,683 | B1 * | 7/2001 | Sekine et al. | 370/328 |
| 6,373,434 | B1 * | 4/2002 | Hayakawa | 342/387 |
| 6,445,713 | B1 * | 9/2002 | Nowara | 370/441 |
| 6,466,628 | B1 * | 10/2002 | Kim | 375/297 |
| 6,546,064 | B1 * | 4/2003 | Hayashi | 375/354 |
| 6,571,099 | B1 * | 5/2003 | Kim et al. | 455/442 |
| 6,650,686 | B1 * | 11/2003 | Kondo | 375/130 |
| 6,717,929 | B1 * | 4/2004 | Ooba | 370/335 |
| 6,738,411 | B1 * | 5/2004 | Ogawa et al. | 375/130 |
| 6,754,497 | B1 * | 6/2004 | Ozluturk | 455/437 |
| 2002/0181558 | A1 * | 12/2002 | Ogawa et al. | 375/147 |
| 2004/0076125 | A1 * | 4/2004 | Nakamura et al. | 370/318 |

FOREIGN PATENT DOCUMENTS

| | | |
|---|---|---|
| EP | 0693834 A1 | 1/1996 |
| EP | 0 769 884 A2 | 4/1997 |
| EP | 0769884 A2 | 4/1997 |
| EP | 0845877 A2 | 3/1998 |
| EP | 1011211 A1 | 6/2000 |
| GB | 2331892 A | 6/1999 |
| JP | 9-116953 | 5/1997 |
| JP | 09-275582 | 10/1997 |
| JP | 09275582 | 10/1997 |
| JP | 10-174158 | 6/1998 |
| JP | 10-191442 | 7/1998 |
| JP | 2801967 | 9/1998 |
| JP | WO98/47246 | 10/1998 |
| JP | 11196460 | 7/1999 |
| WO | WO 95/22213 | 8/1995 |
| WO | 97/06648 | 2/1997 |
| WO | WO 97/32445 | 9/1997 |
| WO | WO97/33400 | 9/1997 |
| WO | WO 98/36588 | 8/1998 |
| WO | 99/25137 | 5/1999 |

OTHER PUBLICATIONS

3G TS 25.213, V3.2.0 (Mar. 2000); 3rd Generation Partnership Project; Technical Specification Group Radio Access Network; Spreading and Modulation (FDD) (Release 1999) pp. 1-26, Mar. 2000.

Volume 3, Specifications of Air-Interface for 3G Mobile System, ver.1.0 (-1.2); Association of Radio Industries and Businesses (ARIB); pp. 8-18 and Annex—(5), Jan. 1999.

Higuchi ey al., Fast Cell Search Algorithm in Inter-Cell Asynchronous DS-CDMA Mobile Radio; IEICE Trans. Commun., vol. E-81-B, No. 7, pp. 1527-1534, Jul. 1998.

Higuchi et al., "Experiments on fast Cell Search Algorothm for Intercell Asynchronous W-CDMA Mobile Radio",Electronics Letters, vol. 35, No. 13, pp. 1046-1047, June.

Supplemental European Search Report Application No. 06077158.1-1249 (6 Pages).

Office Action for European Patent Application No. 00939061.8-1249 dated May 11, 2007 (5 pages).

Notification of the First Office Action Application No. 200510108641.X; mailing date Apr. 4, 2008.

Office Action for Japanese Patent Application No. 2005-283015 dated Sep. 16, 2008 (4 pages).

Official Notice of Rejection, Case No. DCMH110038, U.S. Appl. No. 11/230,103.

Official Notice of Rejection, Case No. DCMH110013, U.S. Appl. No. 11/168,899.

* cited by examiner

| RANKING | Code# | PHASE |
|---------|-------|-------|
| 1 | 05 | 02 |
| 2 | 31 | 94 |
| 3 | 01 | 15 |
| 4 | 44 | 07 |
| 5 | 64 | 96 |
| . | . | . |
| . | . | . |
| . | . | . |
| N | 198 | 55 |

NEIGHBORING BASE STATION
INFORMATION SENT FROM BASE STATION

| RANKING | SEARCH PERIOD (SECOND) |
|---------|------------------------|
| 1 | 1 |
| 2 | 2 |
| 3 | 4 |
| 4 | 8 |
| 5 | 16 |
| . | . |
| . | . |
| . | . |
| N | 64 |

CORRESPONDENCE TABLE
HELD BY MOBILE STATION

FIG.12

MANAGEMENT TABLE
(STORING LONG CODE PHASE INFORMATION)

| LONG CODES OF NEIGHBORING BASE STATIONS | LONG CODE PHASE DIFFERENCE INFORMATION |
|---|---|
| 1101001100 ··· | Δ1 |
| 1101000011 ··· | Δ2 |
| 1101001010 ··· | Δ3 |
| 1101001111 ··· | Δ4 |
| 1101000000 ··· | Δ5 |
| 1101000001 ··· | Δ6 |
| ⋮ | |
| 1101001011 ··· | Δ(N−1) |
| 1101001001 ··· | ΔN |

FIG.16

NEIGHBORING BASE STATION INFORMATION UPDATE METHOD, INFORMATION MANAGEMENT METHOD FOR CELL SEARCH IN MOBILE COMMUNICATIONS SYSTEM, CELL SEARCH METHOD OF MOBILE STATION, MOBILE COMMUNICATIONS SYSTEM, MOBILE STATION, BASE STATION AND CONTROL STATION

FIELD OF THE INVENTION

The present invention relates to a neighboring base station information update method, an information management method for cell search in a mobile communications system, a cell search method of a mobile station, a mobile communications system, a mobile station, a base station and a control station. More particularly, the present invention relates to, for example, a neighboring base station information update method in a mobile communications system comprising a plurality of base stations for transmitting perch channels and neighboring base station information and a mobile station for receiving the neighboring base station information, searching for a perch channel using neighboring base station information, and for receiving the perch channel. In addition, the present invention relates to, for example, an information management method for cell search in a mobile communications system employing a direct sequence CDMA (DS-CDMA) communications scheme that carries out multiple access utilizing a spread spectrum.

BACKGROUND ART

A prevailing mobile communications system such as a mobile telephony system divides its entire service area into rather small radio zones called cells to provide services. As shown in FIG. 1, such a system comprises a plurality of base stations 111-1-111-5 that cover the radio zones, and mobile stations 112-1-112-3 that communicates with the base stations 111-1-111-5 by establishing radio channels with them.

As main access methods between the base stations and mobile stations, there are frequency division multiple access (FDMA), time division multiple access (TDMA) and code division multiple access (CDMA). In any access schemes, each base station transmits a channel for enabling the mobile stations to identify the base station to be connected. Such a channel is called a perch channel, here. In the FDMA scheme or TDMA scheme, the perch channels of the base stations utilize different radio frequencies so that the mobile stations can identify the base stations by the radio frequencies. On the other hand, the direct sequence (DS)-CDMA is a scheme that allows a plurality of users to communicate in the same radio frequency band by transmitting information by carrying out secondary modulation that spreads a conventional information data modulation signal using a high rate spreading code. The radio wave of each user is identified by the spreading code assigned to the user.

Incidentally, the radio signal transmitted from a base station at certain transmission power travels through space with a certain attenuation, and arrives at a receiving site. Since the attenuation the radio signal undergoes increases with the distance from the transmitting site to the receiving site, it is natural that a perch channel transmitted from a distant base station is received at a lower received level, and a perch channel transmitted from a near base station is received at a higher received level. In practice, however, the propagation loss is not determined only by the distance, but varies because of such conditions as geography and buildings. As a result, the received power of the perch channels from the base stations fluctuate sharply with the move of the mobile station. To receive the signals from the base stations with better quality, it is important for the mobile station to continuously monitor the perches from the base stations, and to select the best base station. In the condition in which the received levels of the perch channels from the base stations fluctuate sharply, perches above a required received level are switched incessantly because the received level of the current perch drops suddenly, or the received level of a perch unreceivable before increases abruptly above the receivable level. To enable the mobile station to trace the best perch channel even in such a condition, a common mobile communications system employs a method that sends information about perch channels used by neighboring base stations from the network side to the mobile station. The information about the neighboring base stations consists of the radio frequencies of perches in FDMA or TDMA system, and of spreading codes or information about their phases in a CDMA system. In such a method, it is necessary for system operators to prepare the information on the neighboring base stations so that the base stations can store the information in advance. The information about the neighboring base stations is decided manually using distances on a map, or using software that simulates actual propagation environment according to data on geography and buildings.

The conventional method, however, has a problem in that the neighboring base station information prepared in advance is inappropriate, it is impossible to quickly follow actual changes of the buildings or geography and the like because it is difficult for the conventional method to accurately estimate actual propagation environment. Inappropriate neighboring base station information presents a serious problem unfavorable to the mobile communication services such as bringing about disconnection of a call or unreceivable state of an incoming call, because it hinders handover control in a communication mode or a cell transition processing in a standby mode of the mobile station.

Direct Sequence CDMA (DS-CDMA) is a scheme for a plurality of users to carry out communications using the same radio frequency band by transmitting information through secondary modulation that spreads a conventional information data modulation signal with a high rate spreading code. Each user is identified by a spreading code assigned to the user. Therefore, a receiver must convert its wideband received input signal to the original narrow-band signal by a process called despreading before it carries out ordinary demodulation. In the course of the despreading, the receiver carries out correlation detection between the received signal and a spreading code replica synchronized to the spreading code phase of the received signal. In particular, synchronization between the spreading code replica of the receiver and the spreading code phase of the received signal at the start of communication is called "initial acquisition".

A normal initial acquisition scheme of a spreading code is performed by multiplying the received signal by the spreading code replica on the receiving side, by calculating correlation between the two signals by integrating the product over a particular interval, and by carrying out square-law detection, followed by making a decision as to whether the synchronization is established depending on whether the output exceeds a threshold value. To detect the correlation, there are two methods: one uses a sliding correlator that carries out a time integral; and the other uses a matched filter that carries out a spatial integral. The matched filter is configured by placing a plurality of sliding correlators in parallel, and hence it can calculate correlation values over multiple tips by varying the spreading code replicas of respective taps in accordance with the spreading code. Accordingly, it is much faster than the sliding correlator, although its circuit scale and current consumption are greater than those of the sliding correlator.

The research-and-development and standardization have been underway of a wideband DS-CDMA system (abbreviated to W-CDMA system from now on) with a spread bandwidth of more than 5 MHz as a candidate of a next generation mobile communications system called IMT-2000. The W-CDMA system is an asynchronous system in which base stations each operate on independent time bases.

FIG. 13 illustrates spreading code assignment schemes in a down-link in an inter-base station asynchronous system and a synchronous system ("SF" in FIG. 13 is an abbreviation of a spreading factor). The cdma 2000 system or IS-95 proposed in the United States as a candidate of the IMT-2000 just as the W-CDMA, implements the inter-base station synchronization using the GPS.

Thus, the inter-base station synchronous system has a common time base for all the base stations, and hence the base stations can use the same spreading code with providing different delays for individual base stations. Accordingly, it is enough for the initial acquisition of the inter-base station synchronous system to only establish timing synchronization of the spreading code. On the other hand, since the inter-base station asynchronous system has no common time base for the base stations, the base stations employ different long codes (called scrambling codes because they convert signals from other cells into noise) to identify themselves. When power is turned on, a mobile station must establish the long code synchronization of a downlink common control channel from a cell site to connect itself to a base station (cell site) that provides the greatest power of the received signal. This operation is referred to as "cell search" in the sense that a cell site to which a radio channel is to be connected is searched for. In the inter-base station asynchronous system, the mobile station must carry out the cell search of all the long codes assigned to the system. In contrast, as for the inter-base station synchronous system, since the long code is limited to one type, it will be obvious that it can perform cell search, that is, establish long code synchronization of the downlink common control channel in a much shorter period than the asynchronous system.

The spreading code synchronization scheme disclosed in international publication No. WO97/33400 and Japanese patent application laid-open No. 11-196460 assigned to the assignee of the present application can speed up the cell search (long code synchronization of the downlink common control channel) of the inter-base station asynchronous system comparable to that of the inter-base station synchronous system. Specifically, the spreading code synchronization scheme takes the following steps as illustrated in FIG. 14. A perch channel (a channel to which the mobile station connects a radio link at the beginning of communication) is doubly spread by a short code that has the same cycle period as the symbol period and is used in common by all the base stations, and by a long code different from base station to base station; the long code spreading is masked at fixed intervals (in other words, the masked portions do not undergo the long code spreading) so that portions spread by only the short code are generated (a symbol spread by only the common short code is called a masked symbol from now on). Since the short code is common to all the base stations, the mobile station calculates the correlation between the received signal and the common short code that is used as the spreading code replica with the matched filter so that a peak is detected at the received timing of the short code spreading portions of the received signal independently of the type of the long codes. Storing the time of the correlation peaks in accordance with the timing of the masked symbols make it possible to establish the timing synchronization of the long code. After that, it is enough for the mobile station to identify the type of the long code that spreads the received signal, which is carried out by detecting the correlation at the timing that has already been obtained by using the spreading code generated by multiplying the short code by the long code as the replica code, and by making a threshold value decision. This fast 3-step cell search method using the long code mask can implement a fast cell search even in the inter-base station asynchronous system.

As for the standardization of the third generation mobile communications system, IMT-2000 (International Mobile Telecommunication—2000), it is developed by 3GPP (Third Generation Partnership Project). Configurations of the channels transmitted from the base station for the mobile station to establish synchronization with the system operated in inter-base station asynchronization is described in detail in the standard "3G TS 25.211 V3.2.0" or "3G TS 25.213". To increase versatility, some modification is made from "Specification of Air-Interface for 3G Mobile System Volume 3". A PSCH (Primary Synchronization CHannel) and a SSCH (Secondary Synchronization CHannel) are standardized as independent physical channels, wherein the PSCH is a channel the mobile station searches at first when establishing synchronization with the system, whereas the SSCH is a channel used for identifying the group of the spreading codes, the long interval spreading codes different for individual base stations. Although such modification is made of the physical configuration, the procedure that the mobile station starts the synchronization to the system using the PSCH, then identifies the group of the long interval spreading code using the SSCH, and finally identifies the long interval spreading code and its timing, and the effect achieved by the process are the same. Although the instant specification refers to "Specification of Air-Interface for 3G Mobile System Volume 3" for convenience sake, application to the 3GPP standard and its effect is the same.

The above is the description of the cell search of the mobile station in the initial acquisition. In a cellular system, however, the cell site providing the mobile station with the greatest received power, that is, the cell site to which the radio link is to be connected, changes as the mobile station moves during the communication. To carry out switching between the cell sites (soft handover), the receiver must regularly measure the received levels of the neighboring cell sites of the current cell site by establishing spreading code synchronization of the downlink perch channels. In the cell search at the soft handover, since the mobile station is notified of the types of the long codes of the neighboring cell sites from the current cell site, the cell search time becomes shorter than that in the initial acquisition.

Furthermore, the mobile station regularly carries out the cell search in the standby mode to search for a cell site to be connected when starting a traffic channel. In this case, the mobile station is also notified of the types of the long codes of the neighboring cell sites from the cell site with which the mobile station communicated last before entering the standby mode via the control channel, the cell search time also becomes shorter than that in the initial acquisition.

Since the inter-base station synchronous system utilizes only a single type long code, the individual cell sites use the long code by shifting it by a fixed time (by a fixed number of chips of the long code). Therefore, in the inter-base station synchronous system, it is enough for the cell search in the standby mode or for the cell search in the handover mode to carry out the search in only a search window around the long code phase that is shifted by the fixed time (fixed number of chips) from the long code phase of the perch channel of the cell site with which the mobile station communicated last before entering the standby mode, or of the current cell site during the handover, which enables quick cell search. Here, the search window refers to a search range obtained when considering the propagation delay from the each cell site.

In the foregoing inter-base station asynchronous system, however, since the long code phase of the perch channel of the cell site with which the mobile station communicated last before entering the standby mode, or the long code phase of the perch channel of the current cell site in the soft handover mode has nothing to do with the long code phases of the neighboring cell sites, the 3-step cell search in the foregoing initial acquisition using the long code mask must be carried out basically, so that it takes rather longer cell search time than the synchronous system. Therefore, the inter-base station asynchronous system has a problem of increasing the consumption power of the mobile station than the synchronous system especially in the standby mode, because the mobile station must operate its demodulating circuit longer.

DISCLOSURE OF THE INVENTION

Therefore, an object of the present invention is to appropriately update and set the information about the neighboring base stations to be delivered from the base station to the mobile station.

Another object of the present invention is to provide an inter-base station asynchronous system capable of enabling the mobile station to implement fast cell search when the mobile station is in a standby mode or enters a soft handover mode.

The subject matter of the present invention is that the mobile station captures base station information about receivable base stations by receiving signals transmitted from the plurality of base stations, and notifies a base station of the captured information. As described above, it is very difficult to accurately estimate the actual propagation environment. Since the present invention is configured such that the base station information observed by the mobile station is used to update the neighboring base station information stored in the base stations, the actual propagation environment is reflected in the neighboring base station information more accurately. Here, the base station information observed by the mobile station includes, for example, a second spreading code number, or a combination of the second spreading code number and its phase information in a system that allows the base station and the mobile station to communicate with each other by spreading a signal into a wideband using a spreading code with a rate higher than the information rate, followed by doubly spreading the signal using a first spreading code set which has the same cycle period as the information symbol period and is used in common by all the station, and using a second spreading code which has a cycle period longer than the information symbol period, and differs for each base station; or the radio frequency of the perch channel. Likewise, the neighboring base station information stored in the base stations includes, for example, a second spreading code number, or a combination of the second spreading code number and its phase information in a system that allows the base station and the mobile station to communicate with each other by spreading a signal into a wideband using a spreading code with a rate higher than the information rate, followed by doubly spreading the signal using a first spreading code set which has the same cycle period as the information symbol period and is used in common by all the station, and using a second spreading code which has a cycle period longer than the information symbol period, and differs for each base station; or the radio frequency of the perch channel.

FIG. 2 is a diagram illustrating an example of coverage of the individual base stations estimated from distances and the like on a map. In FIG. 2, underlines attached to the base stations BS2, BS3, BS4, and BS5 indicate that it is enough for the base station BS1 to register the information about these base stations as its neighboring base station information.

It is assumed, however, that the coverage changes as shown in FIG. 3 in an actual propagation environment. In this case, when the mobile station tries to make handover from the base station BS1 to the base station BS6, it cannot complete the handover and its communication is disconnected because the information about the BS6 is not registered as the neighboring base station information in the BS1.

However, according to the present invention, since the actual propagation environment is reflected such that the mobile station near the boundary between the base stations BS1 and BS6 notifies the two base stations of the fact that it can receive the signals from these base stations, the handover from the base station BS1 to BS6 becomes possible (see, FIG. 4). Incidentally, although the estimated coverage is represented by circles but actual coverage is not in FIGS. 2-4, these figures illustrate only that the estimated areas are inconsistent with the actual areas. It is not essential that the estimated coverage is represented by circles.

Furthermore, a configuration that measures the second spreading code together with the phase information, and delivers them to the base station enables the fast cell search for the handover (search for the perch channels of the base stations) at small consumption power using the phase information (FIG. 4). Here, the phase information is the information that represents the phase differences between the second spreading code used by the current base station and the second spreading codes used by the neighboring base stations. The mobile station can quickly search for the neighboring base stations according to the phase of the second spreading code of the current base station.

Moreover, a configuration in which the base station assigns priority to the neighboring base station information in accordance with the number of reports, handover success rate, or the number of handover successes enables the mobile station to search for the perch channel estimated to be received at a higher probability at first, thereby limiting the time and power required for the cell search.

To accomplish the objects of the present invention, according to the first aspect of the present invention, there is provided a neighboring base station information update method in a mobile communications system including a plurality of base stations that transmit perch channels and neighboring base station information, and a mobile station that receives the neighboring base station information, searches a perch channel in accordance with the neighboring base station information, and receives the perch channel, the neighboring base station information update method comprising: in the mobile station, a base station information capturing step of capturing from a received perch channel, base station information about the base station that transmits the perch channel; and a base station information transmitting step of transmitting the base station information captured in the base station information capturing step to one of the base stations, and in the one of the base stations, a base station information receiving step of receiving the base station information the mobile station transmits; and a neighboring base station information updating step of updating the neighboring base station information in accordance with the base station information received in the base station information receiving step.

Here, the perch channel may be spread into a wideband using a spreading code with a rate higher than an information rate, and in addition, may be doubly spread using a first spreading code set that has a cycle period equal to an information symbol period and is common to all the base stations, and a second spreading code that has a cycle period longer than the information symbol period and differs from base station to base station; and the base station information may consist of a second spreading code number used by the base station and phase information about the second spreading code.

Here, the perch channel may be spread into a wideband using a spreading code with a rate higher than an information rate, and in addition, may be doubly spread using a first spreading code set that has a cycle period equal to an information symbol period and is common to all the base stations, and a second spreading code that has a cycle period longer than the information symbol period and differs from base station to base station; and the base station information may consist of a second spreading code number used by the base station.

Here, the base station information may consist of a radio frequency of the perch channel.

Here, the one of the base stations may rearrange the neighboring base station information in a descending order of the number of times each base station is included in the base station information received in the base station information receiving step.

Here, the one of the base stations may rearrange the neighboring base station information in a descending order of handover success rate of each base station, which is calculated from success or failure results of handover.

Here, the one of the base stations may rearrange the neighboring base station information in a descending order of the number of handover successes of each base station.

Here, the one of the mobile stations may carry out perch channel search at a higher frequency for a higher priority base station, and at a lower frequency for lower priority base station.

Here, the one of the base stations may transmit the neighboring base station information of upper N base stations, where N is a predetermined constant.

According to the second aspect of the present invention, there is provided a mobile communications system including a plurality of base stations that transmit perch channels and neighboring base station information, and a mobile station that receives the neighboring base station information, searches a perch channel in accordance with the neighboring base station information, and receives the perch channel, the mobile station comprising: base station information capturing means for capturing from a received perch channel, base station information about the base station that transmits the perch channel; and base station information transmitting means for transmitting the base station information captured by the base station information capturing means to one of the base stations, and the base stations comprising: base station information receiving means for receiving the base station information the mobile station transmits; and neighboring base station information updating means for updating the neighboring base station information in accordance with the base station information received by the base station information receiving means.

Here, the perch channel may be spread into a wideband using a spreading code with a rate higher than an information rate, and in addition, may be doubly spread using a first spreading code set that has a cycle period equal to an information symbol period and is common to all the base stations, and a second spreading code that has a cycle period longer than the information symbol period and differs from base station to base station; and the base station information may consist of a second spreading code number used by the base station and phase information about the second spreading code.

Here, the perch channel may be spread into a wideband using a spreading code with a rate higher than an information rate, and in addition, may be doubly spread using a first spreading code set that has a cycle period equal to an information symbol period and is common to all the base stations, and a second spreading code that has a cycle period longer than the information symbol period and differs from base station to base station; and the base station information may consist of a second spreading code number used by the base station.

Here, the base station information may consist of a radio frequency of the perch channel.

Here, the base stations may rearrange the neighboring base station information in a descending order of the number of times each base station is included in the base station information received by the base station information receiving means.

Here, the base stations may rearrange the neighboring base station information in a descending order of handover success rate of each base station, which is calculated from success or failure results of handover.

Here, the base stations may rearrange the neighboring base station information in a descending order of the number of handover successes of each base station.

Here, the mobile stations may carry out perch channel search at a higher frequency for a higher priority base station, and at a lower frequency for lower priority base station.

Here, the base stations may transmit the neighboring base station information of upper N base stations, where N is a predetermined constant.

According to the third aspect of the present invention, there is provided a mobile station that searches a perch channel transmitted by a base station, and receives the perch channel, the mobile station comprising: base station information capturing means for capturing from a received perch channel, base station information about the base station that transmits the perch channel; and base station information transmitting means for transmitting the base station information captured by the base station information capturing means to a base station.

According to the fourth aspect of the present invention, there is provided a base station that transmits neighboring base station information, the base station comprising: base station information receiving means for receiving the base station information a mobile station transmits; and neighboring base station information updating means for updating the neighboring base station information in accordance with the base station information received by the base station information receiving means.

According to the fifth aspect of the present invention, there is provided an information management method for cell search in a mobile communications system comprising: a capturing step of capturing, in a handover-source base station, phase difference information between a long period spreading code of a common control channel from the handover-source base station and a long period spreading code of a common control channel from a handover-destination base station, the phase difference information being calculated by at least one mobile station that is communicating with the handover-source base station; and a storing step of storing, in the handover-source base station and/or its control station, the captured phase difference information.

Here, the storing step may store, in the handover-source base station and/or its control station, an average of a plurality of pieces of the phase difference information between the long period spreading code of the common control channel from the handover-source base station and the long period spreading code of the common control channel from the handover-destination base station, the plurality of pieces of the phase difference information being captured from a plurality of mobile stations that are communicating with the handover-source base station.

Here, the information management method for cell search in a mobile communications system may further comprise: a supplying step of supplying, from a control station that stores the phase difference information to the base station, the phase difference information between the base station and its neighboring base stations from among the phase difference information stored.

According to the sixth aspect of the present invention, there is provided a cell search method of a mobile station comprising: a capturing step of capturing, from a base station, phase difference information between a long period spreading code of a common control channel of the base station and a long period spreading code of a common control channel of a neighboring base station of the base station; and a cell search step of carrying out cell search in accordance with the phase difference information captured.

Here, the cell search step may carry out the cell search within a fixed time range in accordance with the phase difference information captured.

According to the seventh aspect of the present invention, there is provided a base station comprising: storing means for storing phase difference information between a long period spreading code of a common control channel of the base station and a long period spreading code of a common control channel of a neighboring base station of the base station, the phase difference information being captured from a mobile station; and management means for managing the phase difference information stored in the storing means.

According to the eighth aspect of the present invention, there is provided a base station comprising: storing means for storing phase difference information between a long period spreading code of a common control channel of the base station and a long period spreading code of a common control channel of a neighboring base station of the base station, the phase difference information being supplied from a control station of the base station; and management means for managing the phase difference information stored in the storing means.

According to the ninth aspect of the present invention, there is provided a control station comprising: storing means for storing phase difference information between a long period spreading code of a common control channel of a base station controlled by the control station and a long period spreading code of a common control channel of a neighboring base station of the base station, the phase difference information being captured from the base station it controls; and management means for managing the phase difference information stored in the storing means.

According to the tenth aspect of the present invention, there is provided a mobile station comprising: phase difference information storing means for storing phase difference information between a long period spreading code of a common control channel of a base station and a long period spreading code of a common control channel of a neighboring base station of the base station, the phase difference information being captured from the base station; and cell search means for carrying out cell search in accordance with the phase difference information stored in the storing means.

Here, the mobile station may further comprise: first long period spreading code type storing means for storing types of long period spreading codes of a predetermined number of base stations to be subjected to the cell search, the mobile station being notified of the types from the base station; second long period spreading code type storing means for storing types of long period spreading codes of the base stations to be subjected to the cell search, the types corresponding to the phase difference information, and the mobile station being notified of the types from the base station; and comparing means for comparing information stored in the first long period spreading code type storing means with information stored in the second long period spreading code type storing means, wherein the cell search means carries out the cell search in accordance with the phase difference information in response to a compared result by the comparing means.

According to the eleventh aspect of the present invention, there is provided a mobile communications system including a base station and a mobile station, the base station comprising: base station storing means for storing phase difference information between a long period spreading code of a common control channel of the base station and a long period spreading code of a common control channel of a neighboring base station of the base station, the phase difference information being captured from the mobile station; and management means for managing the phase difference information stored in the storing means, and the mobile station comprising: mobile station storing means for storing the phase difference information captured from the base station; and cell search means for carrying out cell search in accordance with the phase difference information stored in the mobile station storing means.

According to the twelfth aspect of the present invention, there is provided a mobile communications system including a base station, a control station for controlling the base station, and a mobile station, the control station comprising: control station storing means for storing phase difference information between a long period spreading code of a common control channel of the base station and a long period spreading code of a common control channel of a neighboring base station of the base station, the phase difference information being captured from the base station; and control station management means for managing the phase difference information stored in the control station storing means, the base station comprising: base station storing means for storing the phase difference information supplied from the control station; and base station management means for managing the phase difference information stored in the base station storing means, and the mobile station comprising: mobile station storing means for storing the phase difference information captured from the base station; and cell search means for carrying out cell search in accordance with the phase difference information stored in the mobile station storing means.

According to the foregoing configurations, the information about the neighboring base stations delivered from the base station to the mobile station is appropriately updated and set.

Measuring the second spreading code together with the phase information, and notifying the base station of them makes it possible to implement fast cell search at small consumption power.

Furthermore, assigning priorities to the neighboring base station information by the base station can limit the time and power required to complete the cell search to a small value.

Moreover, the mobile station can implement the fast cell search in the inter-base station asynchronous system when the mobile station is in a standby mode or enters a soft handover mode.

BRIEF DESCRIPTION OF THE DRAWINGS

FIG. 2 is a diagram illustrating an example of coverage of the individual base stations estimated from distances on a map and the like;

FIG. 12 is a diagram illustrating ranking tables used for changing search frequency of perch channels by assigning priorities to base stations according to neighboring base station information sent from the base station in the first embodiment in accordance with the present invention;

FIG. 16 is a diagram showing management table in a storage in a base station or control station in the second embodiment in accordance with the present invention;

BEST MODES FOR CARRYING OUT THE PRESENT INVENTION

The best mode for carrying out the present invention will now be described with reference to the drawings.

First Embodiment

A mobile communications system of the first embodiment in accordance with the present invention comprises a plurality of base stations for transmitting perch channels and neighboring base station information, and a mobile station for receiving the neighboring base station information, and for searching and receiving a perch channel according to the neighboring base station information. Each base station of the present embodiment transmits its perch channel that includes the neighboring base station information, that is, information about its neighboring base stations such as their perch channels.

Although the present invention is applicable regardless of the radio access schemes, the mobile communications system of the present embodiment employs the CDMA as the radio access scheme. A spreading code consists of a combination of two types of spreading codes: a first spreading code set that has a cycle period equal to an information symbol period and is common to all the base stations; and a second spreading code that has a cycle period longer than the information symbol period, and differs from base station to base station.

Figure 5:
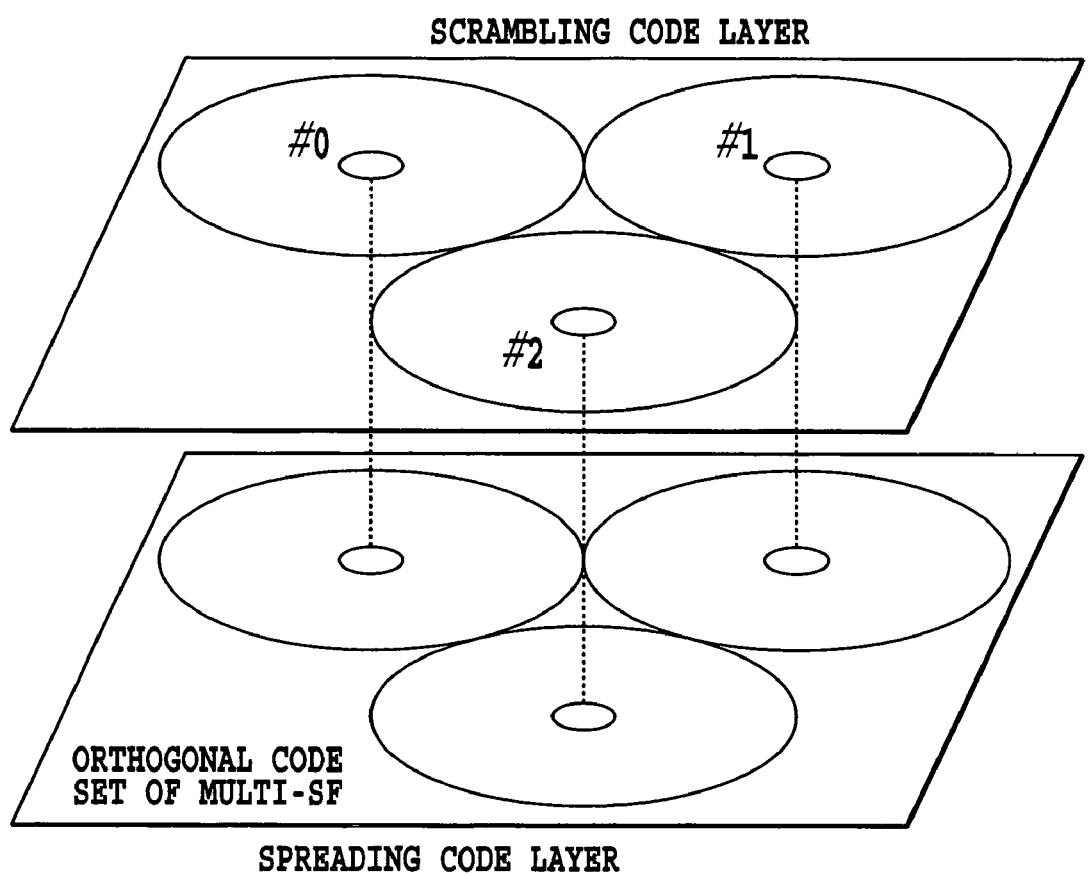
FIG. 5 is a schematic diagram illustrating a method of utilizing the spreading codes of a mobile communications system of a first embodiment in accordance with the present invention.

FIG. 5 is a schematic diagram illustrating a method of utilizing the spreading codes of the mobile communications system of the first embodiment in accordance with the present invention (the symbol "SF" in FIG. 5 is an abbreviation of spreading factor). In FIG. 5, the upper layer represents a layer of scrambling codes with a long period assigned to individual base stations, whereas the lower layer represents a layer of spreading codes with a short period used in common by all the base stations. The signals transmitted from the base stations are identified by the long period scrambling codes assigned to the base stations.

Figure 6:
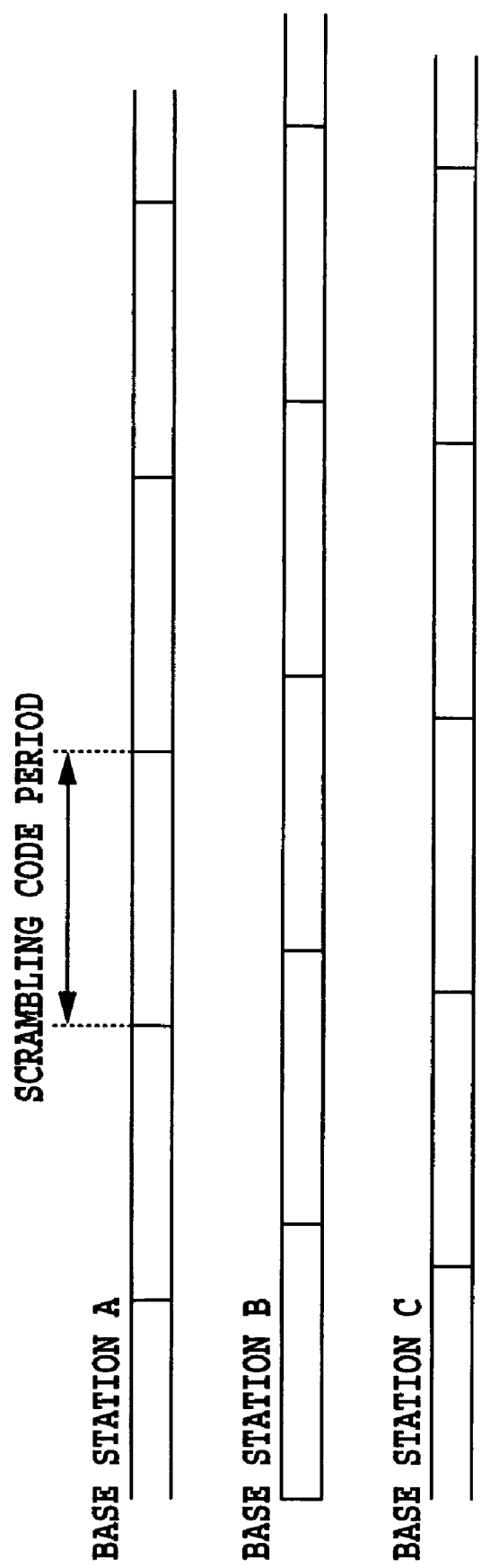
FIG. 6 is a schematic diagram illustrating timing relationships between scrambling codes in terms of signals sent from base stations and received by a mobile station of the first embodiment in accordance with the present invention.

FIG. 6 is a schematic diagram illustrating timing relationships between scrambling codes in signals sent from a few base stations and received by a mobile station of the first embodiment. The mobile communications system of the present embodiment is an asynchronous mobile communications system requiring no inter-base station synchronization, and hence the timings of the scrambling codes received by the mobile station vary from base station to base station.

Figure 7:
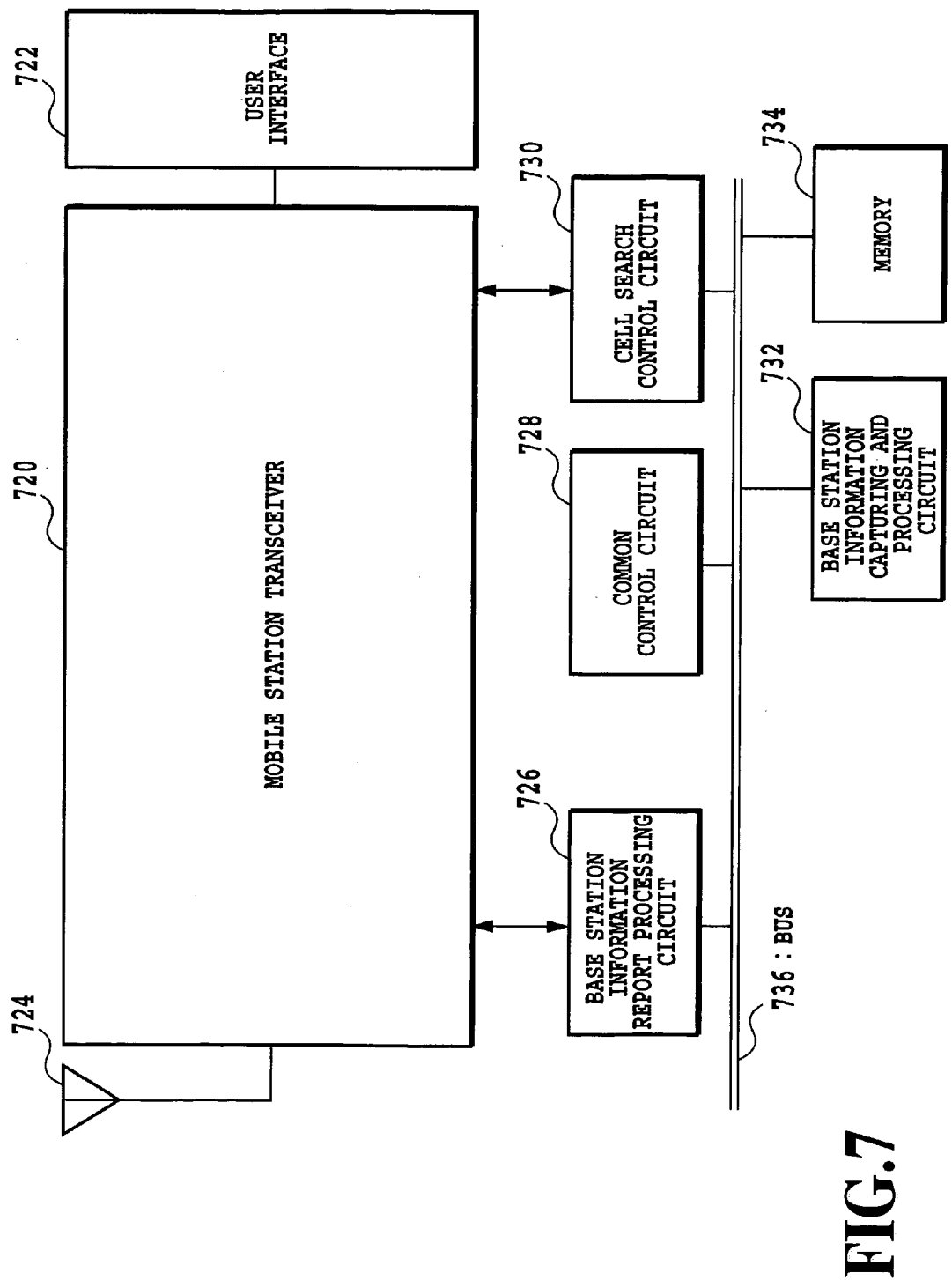
FIG. 7 is a block diagram showing a configuration of a mobile station of the first embodiment in accordance with the present invention.

FIG. 7 is a block diagram showing a configuration of the mobile station of the first embodiment. FIG. 7 shows only a portion relating to the present invention. The mobile station of the present embodiment comprises a mobile station transceiver 720, a user interface 722, an antenna 724, a base station information report processing circuit 726, a common control circuit 728, a cell search control circuit 730, a base station information capturing and processing circuit 732, a memory 734, and a bus 736. The mobile station of the present embodiment searches for perch channels base stations transmit and receives them to determine the base station that the mobile station communicates with or camps on.

The mobile station transceiver 720 decodes radio-modulated user information or a control signal transmitted from the base station, or transmits a user signal or control signal after coding and modulating them. The mobile station transceiver 720 is connected to the antenna 724 and user interface 722. The common control circuit 728 controls the mobile station in its entirety. The cell search control circuit 730 controls the cell search operation by controlling the timing in accordance with the priority of the neighboring base station information. In addition, the cell search control circuit 730 stores the cell search result in the memory 734 so that other circuits can utilize the cell search result. The base station information capturing and processing circuit 732 generates scrambling code information and phase information about the base station using the cell search result stored in the memory 734. The base station information report processing circuit 726 commands the mobile station transceiver 720 to transmit the base station information generated to deliver it to the base station. The common control circuit 728, cell search control circuit 730, base station information capturing and processing circuit 732, base station information report processing circuit 726 and memory 734 are interconnected via the bus.

Figure 8:
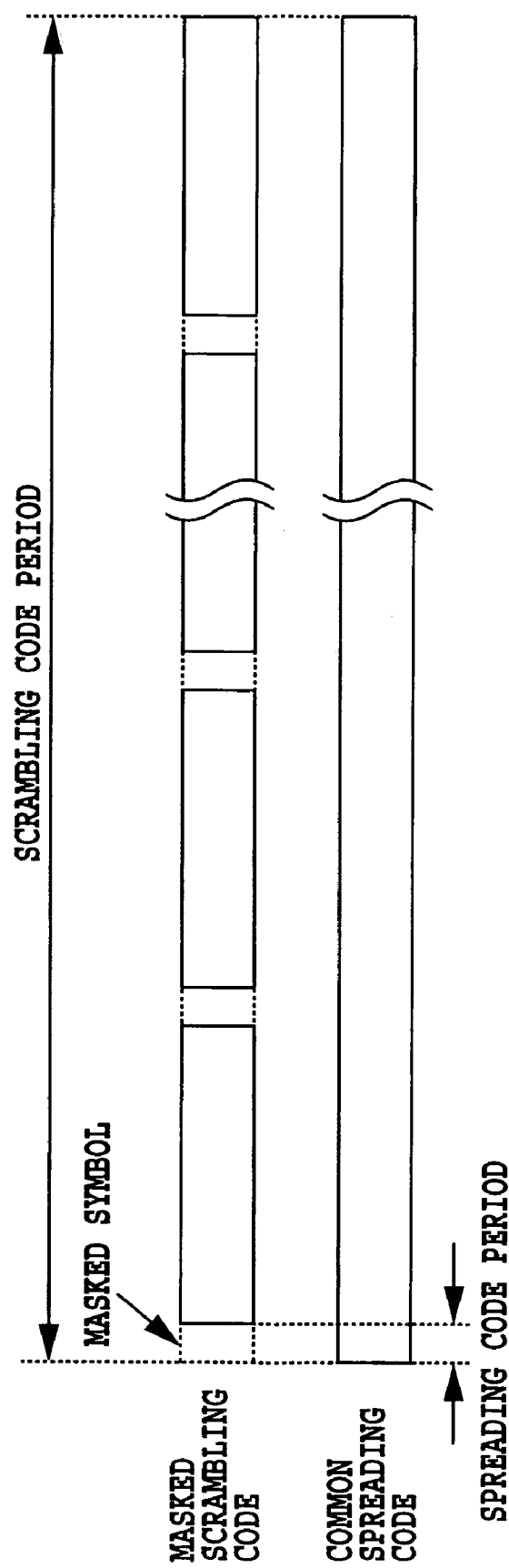
FIG. 8 is a diagram illustrating a structure of a perch channel of the first embodiment in accordance with the present invention.
Figure 9:
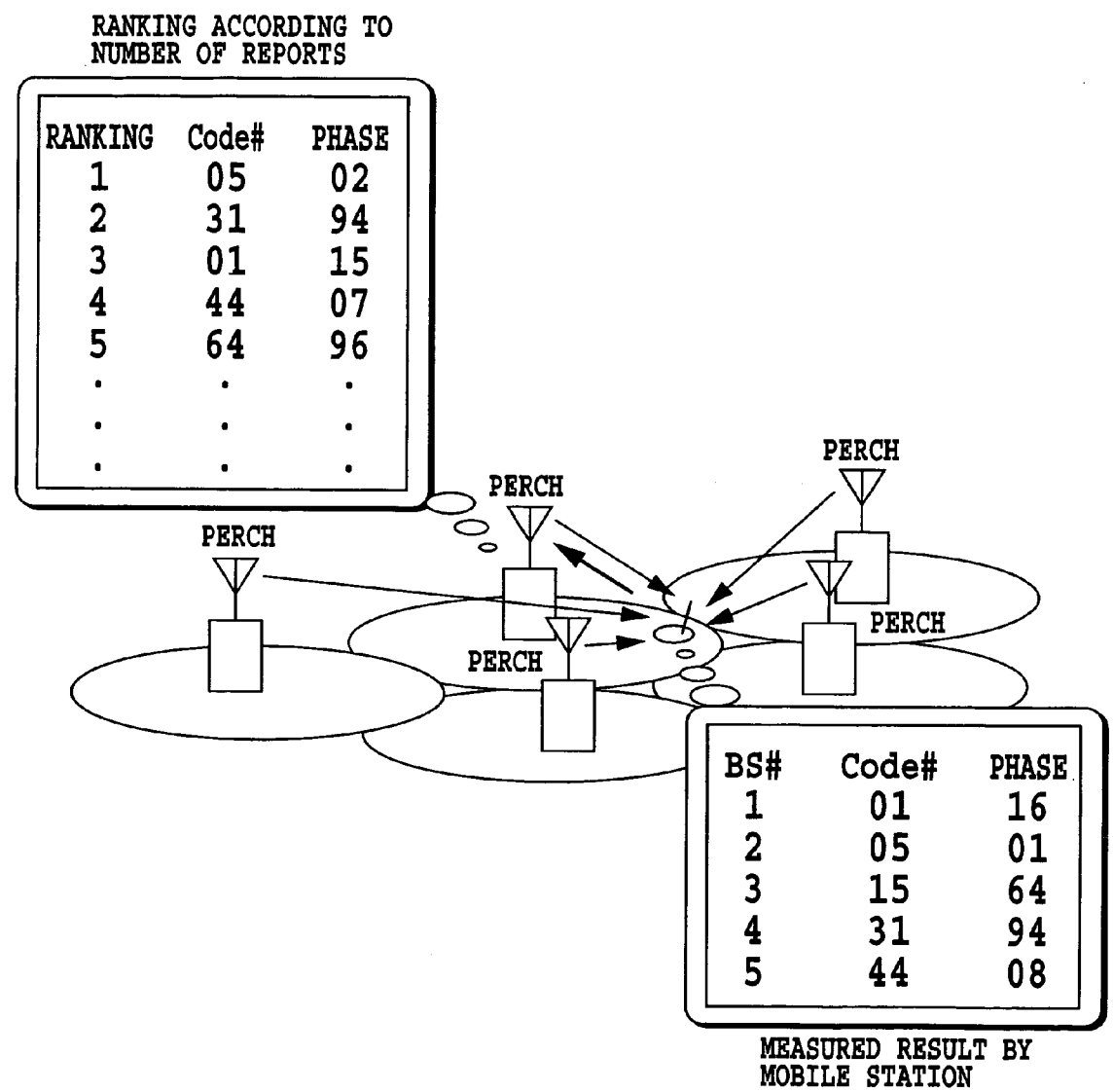
FIG. 9 is a diagram illustrating a scheme in the first embodiment in accordance with the present invention in which a mobile station captures information from base stations, and sends it to the base station connected therewith, so that the base station can update the information.

FIG. 8 is a diagram illustrating a structure of a perch channel of the first embodiment. The cell search operation controlled by the cell search control circuit 730 will now be described. The perch channel is a channel used by the mobile station to establish synchronization with the system at power on to capture the system information, and to detect that it moves to another base station during communication or standby mode. Each base station transmits at least one perch channel at fixed transmission power. The perch channel is spread to a wideband using a spreading code with a rate higher than an information rate. The perch channel is then doubly spread using a spreading code that has the cycle period equal to the symbol period and is used in common by all the base stations, and a scrambling code that varies for each base station. The scrambling code used for spreading the perch channel is masked at every fixed interval, and the masked portions are spread by the spreading code, but not by the scrambling code. This portions are called a masked symbol. The spreading code used for the perch channel is common to all base stations. The mobile station, which calculates correlation with a matched filter using the common spreading code as a spreading code replica, can detect a peak of the correlation at the received timing of the spread portions by the spreading code of the received signal regardless of the type of the scrambling code used. Storing the timings of the masked symbol beginning from the correlation peak can establish the timing synchronization of the scrambling code. Subsequently, the number of the scrambling code for spreading the received signal is identified. Using the spreading code obtained by multiplying the spreading code by the scrambling code as a replica makes it possible to decide as to whether the received perch uses the scrambling code or not by detecting correlation at the timings already obtained, followed by making a threshold decision. Iterating the processing for possible scrambling codes can identify the scrambling code used by the received perch. The cell search method is described in Higuchi, Sawahashi, Adachi, "Fast Cell Search Algorithm in Inter-Cell Asynchronous DS-CDMA Mobile Radio," IEICE Trans. Commun., Vol. E81-B, No. 7, July 1998. The foregoing operation enables the mobile station to capture the base station information. In other words, the mobile station can capture the scrambling code number and phase information about the receivable perch channel. FIG. 9 illustrates a scheme in which the mobile station captures information of base stations, and sends it to the base station connected therewith, so that the base station can update the information.

In the present embodiment, the base station information consists of the second spreading code number used by the base station and the phase information about the code. Using the phase information enables high speed cell search at low consumption power. Here, the base station information can consist of only the second spreading code number used by the base station. The base station information can also consist of the phase difference information that will be described in the second embodiment. Alternatively, it is also possible to employ the FDMA or TDMA as the radio access scheme with the base station information consisting of the radio frequency of the perch channel.

Figure 1:
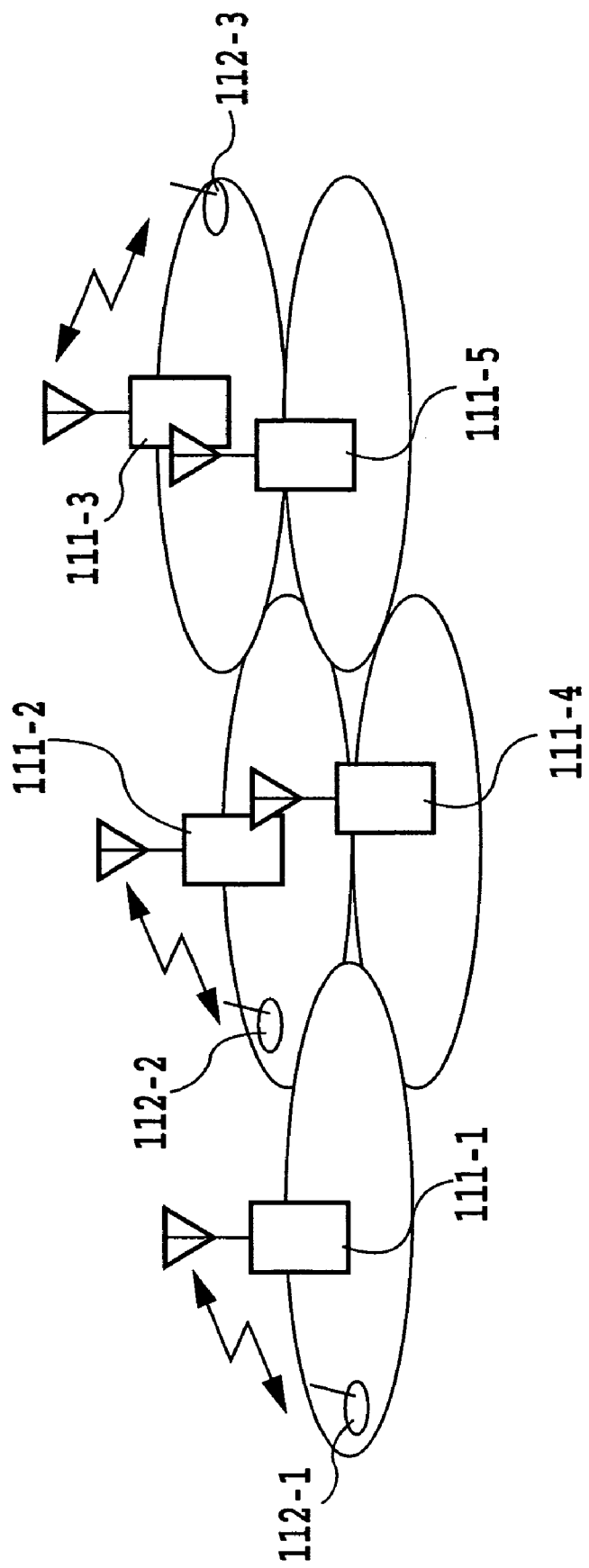
FIG. 1 is a diagram showing an example of a mobile communications system.
Figure 2:
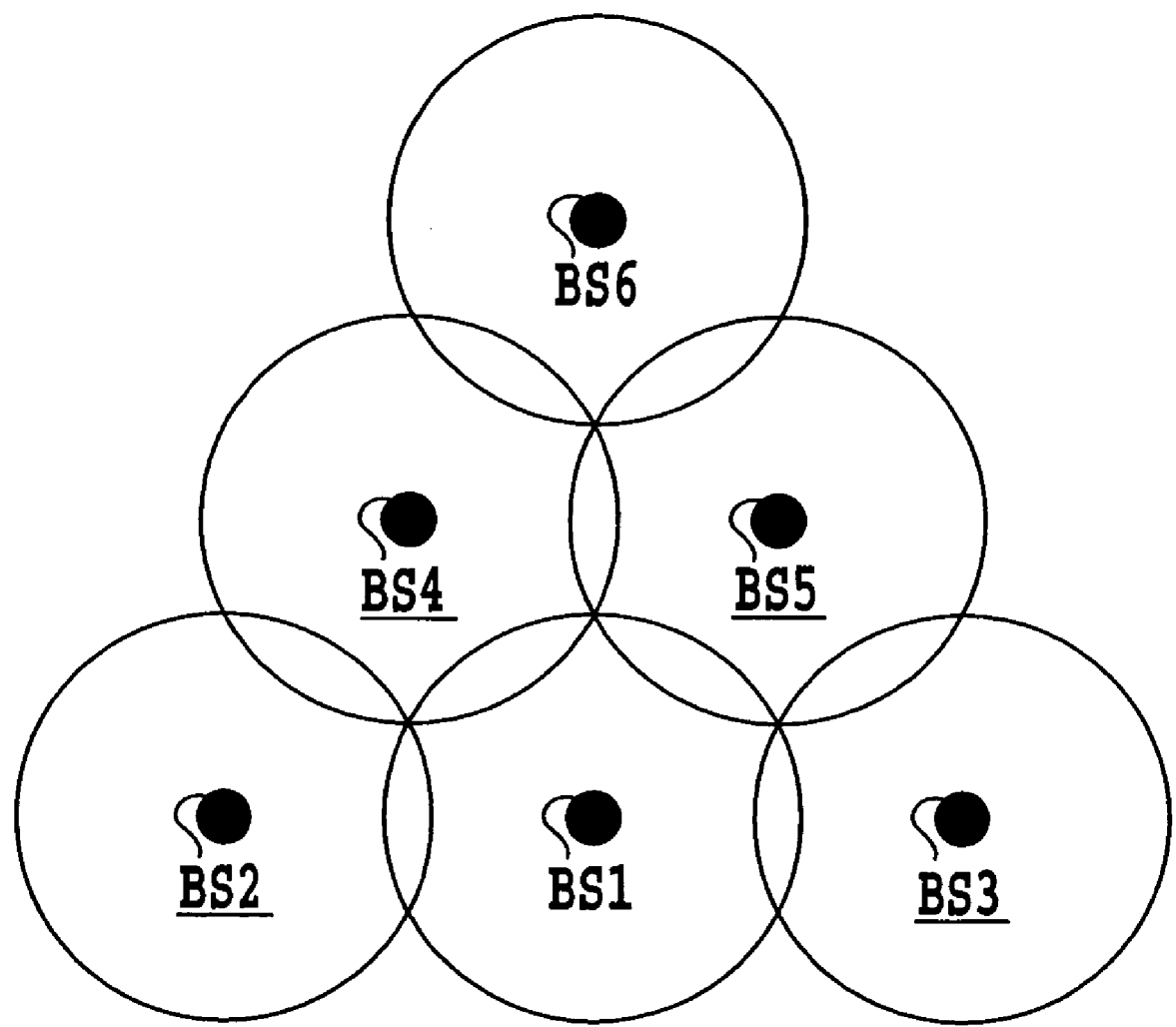
Figure 3:
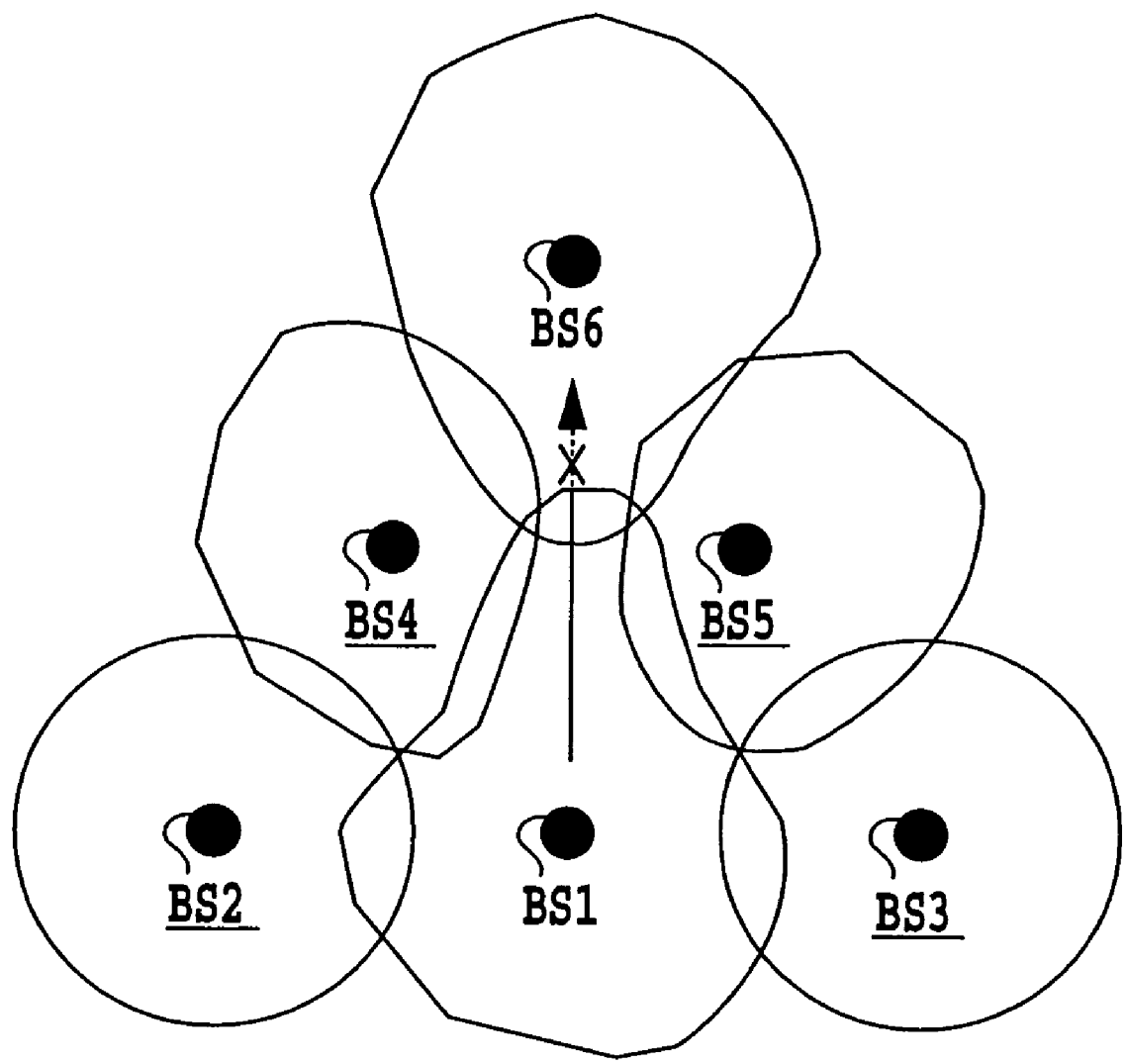
FIG. 3 is a diagram illustrating an example of actual coverage of the individual base stations.
Figure 4:
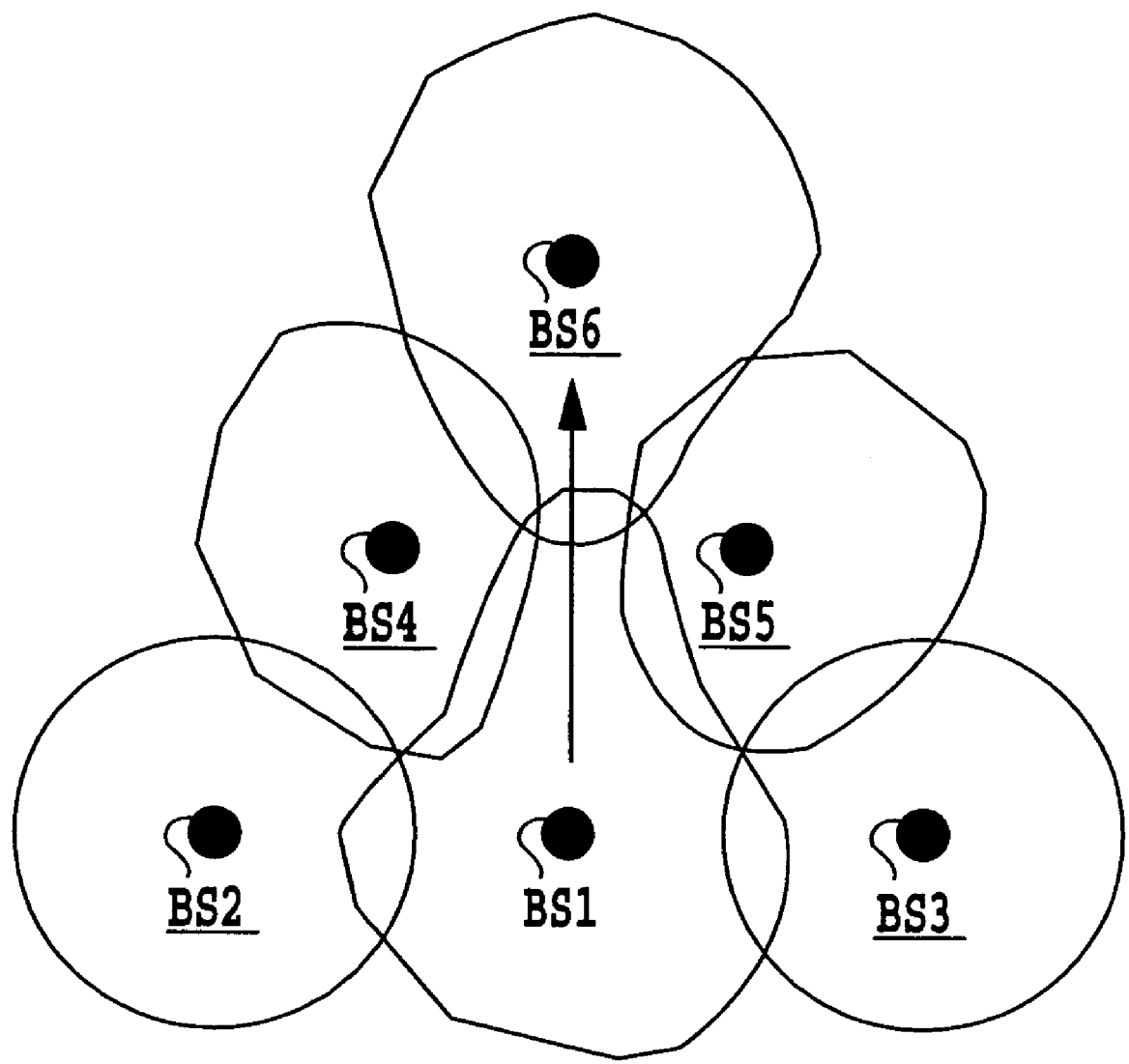
FIG. 4 is a diagram illustrating handover in the case where the present invention is applied to the actual coverage of the individual base stations.

The mobile station transmits the base station information to the base station. When it newly obtains the base station information on the BS6 as shown in FIG. 4, it transmits the base station information on the BS6 to, for example, the BS1. It can also transmit the base station information on the BS1 to the BS6. As for the transmission of the base station information to the BS6, the mobile station can transmit it directly, or via the BS1. The base station receiving the base station information from the mobile station updates the neighboring base station information according to the base station information.

The base station can assign priorities to the neighboring base station information.

Figure 10:
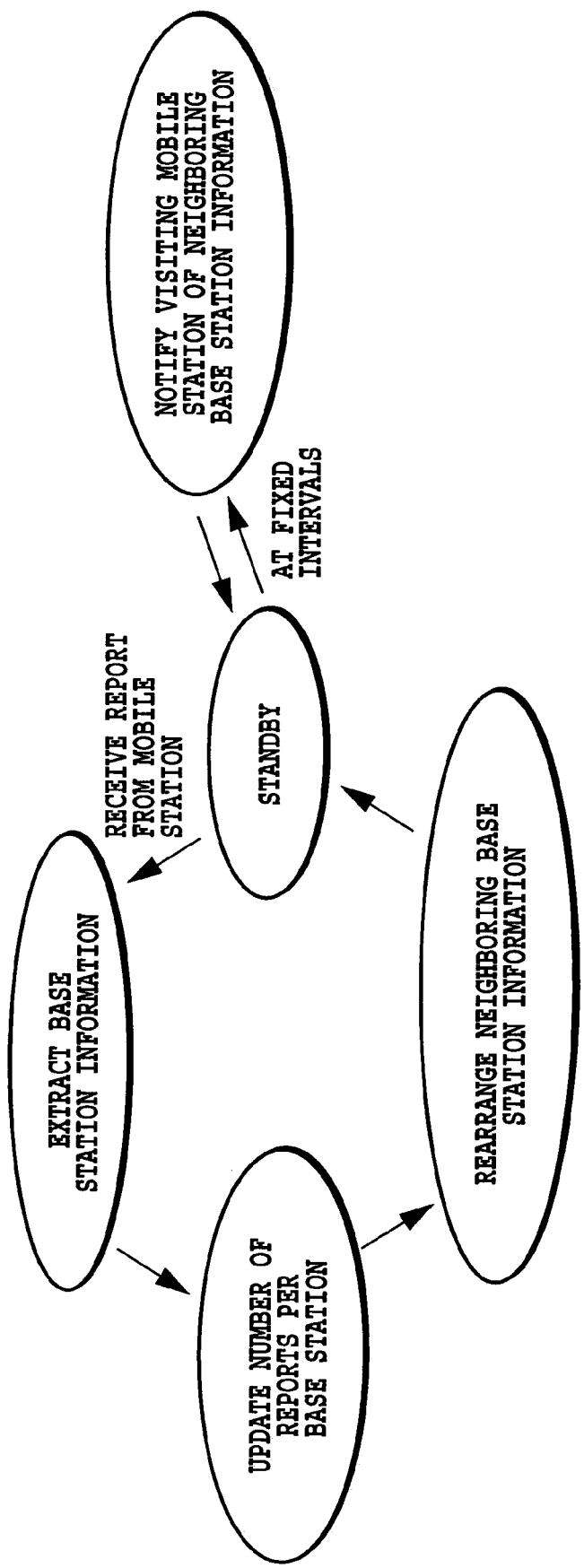
FIG. 10 is a diagram illustrating a state transition when assigning priorities according to the number of reports in the first embodiment in accordance with the present invention.

FIG. 10 is a diagram illustrating a state transition when assigning priorities according to the number of reports. The base station reports (transmits) the neighboring base station information to the visiting mobile station of at every fixed interval. Receiving the base station information from the mobile station, the base station extracts the base station information and updates the number of reports of each base station. Then, it rearranges the neighboring base station information in the descending order of the number of reports, that is, in the descending order of the number of times each base station is included in the base station information.

Figure 11:
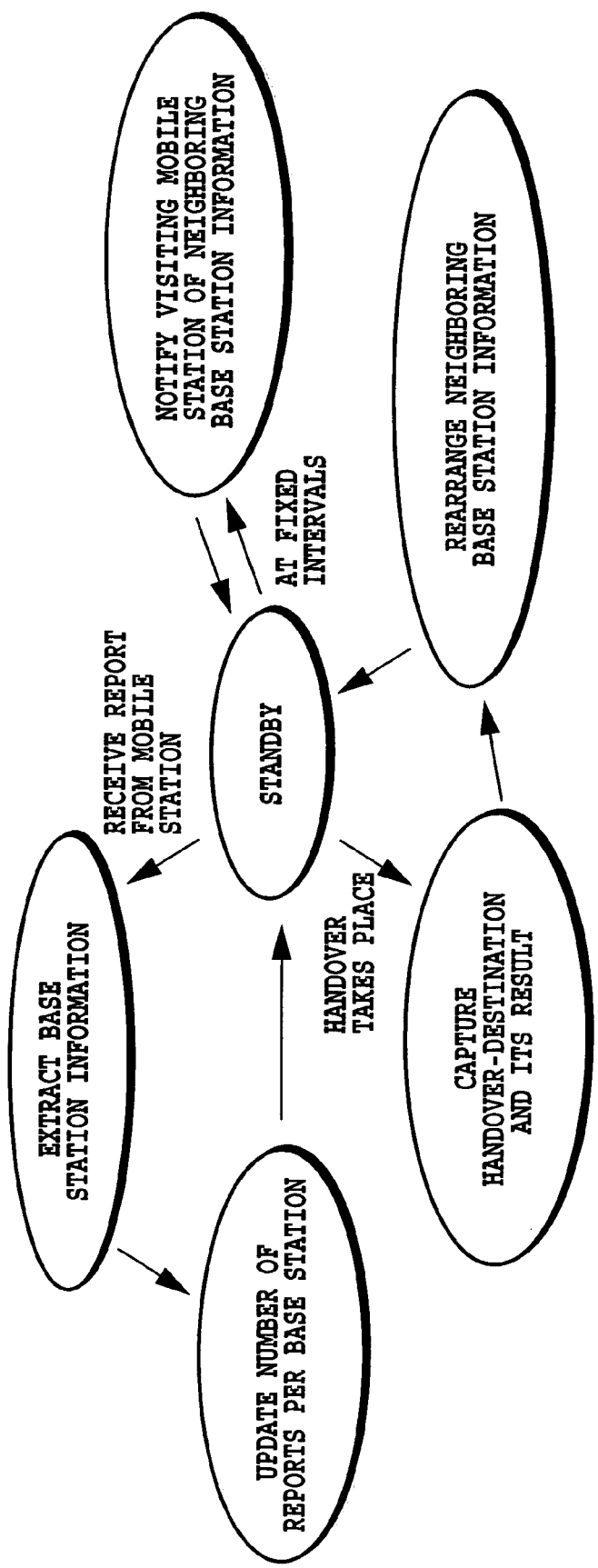
FIG. 11 is a diagram illustrating a state transition when assigning priorities according to handover success rate or the number of handover successes in the first embodiment in accordance with the present invention.
Figure 13:
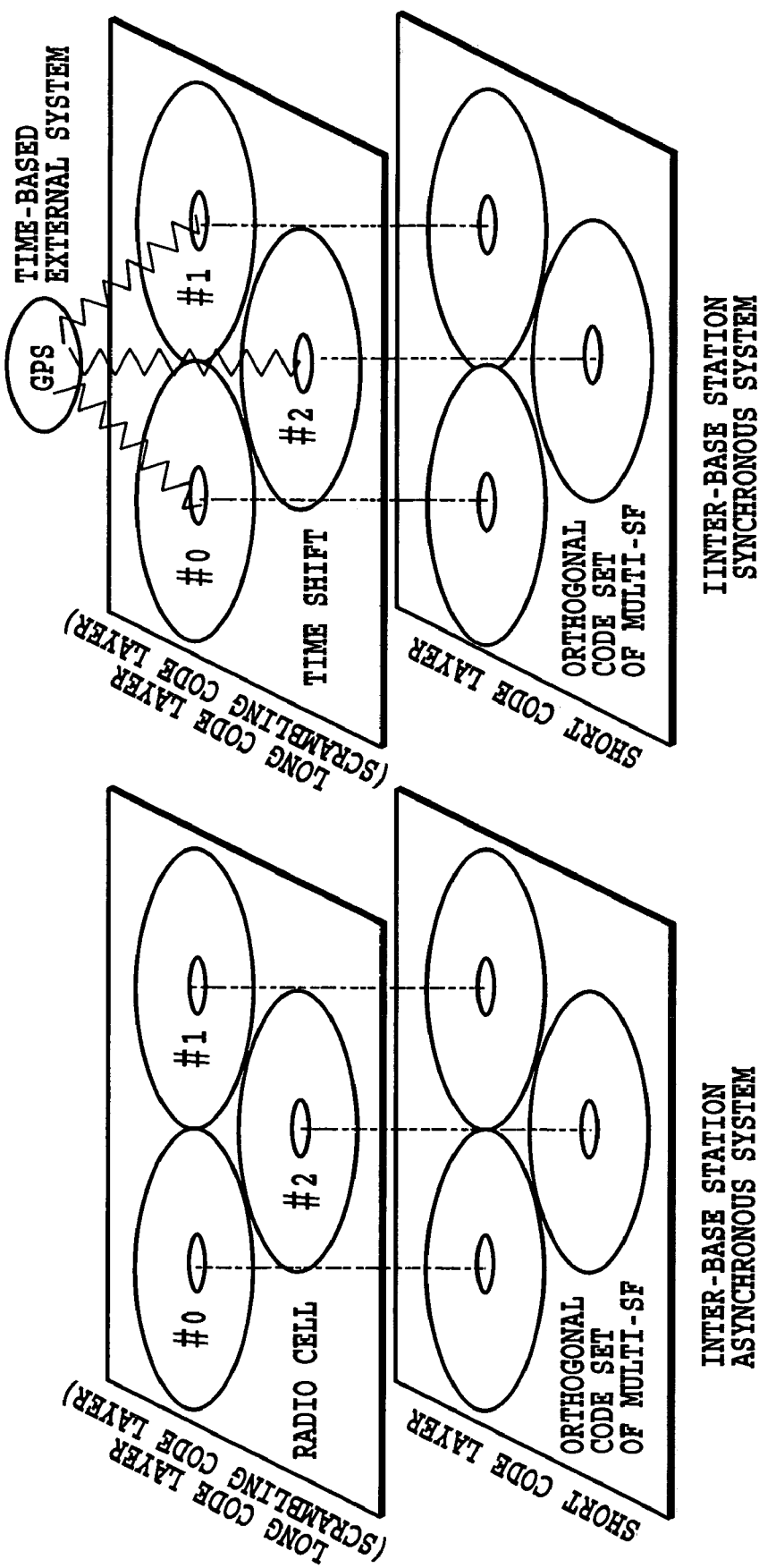
FIG. 13 is a diagram illustrating spreading code assignment schemes in a downlink of an inter-base station asynchronous system and that of an inter-base station synchronous system.
Figure 14:
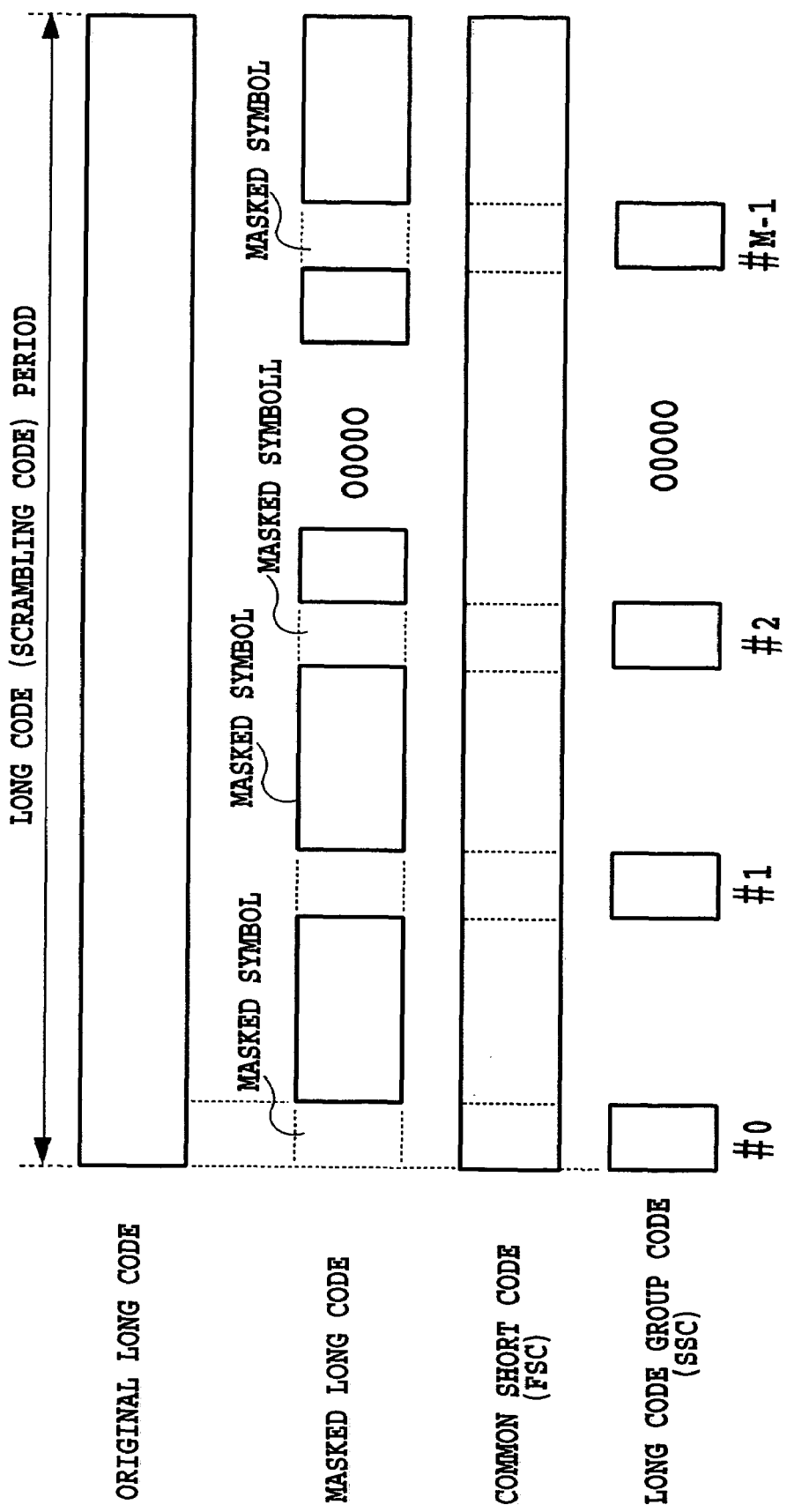
FIG. 14 is a diagram illustrating an example of a transmitted signal when using a long code mask.

FIG. 11 is a diagram illustrating a state transition when assigning priorities according to a handover success rate or the number of handover successes. The base station reports (transmits) the neighboring base station information to the visiting mobile station at every fixed interval. Receiving the base station information from the mobile station, the base station extracts the base station information and updates the number of reports of each base station. When handover takes place, the base station captures information about the handover destination and its result, and rearranges the neighboring base station information. Specifically, it can capture success or failure results of the handover, calculate the success rate of the handover, and rearrange the neighboring base station information in the descending order of the success rate of the handover of each base station. Alternatively, it can capture the number of successes of the handover, and rearrange the neighboring base station information in the descending order of the number of successes of the handover of each base station.

When the base station assigns priorities to the neighboring base station information, it can transmit the neighboring base station information about upper N base stations (where N is a predetermined constant).

On the other hand, receiving the ranked neighboring base station information, the mobile station can search for the perch channel at a higher frequency for a higher priority base station, and at a lower frequency for a lower priority base station.

FIG. 12 is a diagram illustrating ranking tables used for changing search frequency of the perch channels by assigning priorities to base stations according to neighboring base station information sent from the base station. Using the neighboring base station information delivered from the base station and a correspondence table prepared in the mobile station in advance, the mobile station can determine the perch search frequency for each base station. Thus, it searches for the perch channel of each base station that is assigned priority according to the neighboring base station information at a search period corresponding to the order in the correspondence table.

Although the search frequency varies according to the priorities in FIG. 12, this is not essential, and various other methods can be conceived. For example, the priorities can be halved to upper and lower ones, which are assigned a higher frequency and a lower frequency, respectively. Using any of these methods can offer a similar advantage as long as a higher priority base station is searched at a higher frequency and a lower priority base station is searched at a lower frequency. In addition, although the relationship between the priority and frequency is predetermined and prestored in the mobile station, this is not essential for applying the present invention. Various other methods can be conceived such as sending this information from the base station at regular intervals, or determining it on the user side. Any of these methods can offer a similar advantage.

As described above, the present invention can suitably update and set the information about the neighboring base stations sent from the individual base stations to the mobile station.

Furthermore, measuring and reporting the second spreading code along with its phase information to the base station can carry out fast cell search at small consumption power.

Moreover, when the base station assigns priorities to the neighboring base station information, the time period and power required by the cell search can be limited to a low value.

Second Embodiment

Although the detail will be described later, the base station as the second embodiment in accordance with the present invention comprises a storing means for storing long code phase difference information reported via an uplink control channel from the mobile station; and a management means for managing the long code phase difference information stored in the storing means. The management means has two functions: sending the long code phase difference information stored in the storing means to a radio network controller (RNC), a control station (higher level station) for controlling the base station; and sending necessary information in the long code phase difference information stored in the storing means to the mobile station. The storing means can be implemented by a control means such as a computer usually installed in the base station, and the two functions can be carried out by the control means.

The base station can comprise a storing means for storing long code phase difference information delivered from the control station, and a management means for managing the long code phase difference information stored in the storing means. The management means has a function to notify the mobile station of necessary information of the long code phase difference information stored in the storing means. The storing means can be implemented by a control means such as a computer usually installed in the base station, and the function is carried out by the control means.

The control station as the second embodiment in accordance with the present invention comprises a storing means for storing long code phase difference information sent from the base stations, and a management means for managing the long code phase difference information stored in the storing means. The management means has a function to notify the base stations of necessary information of the long code phase difference information stored in the storing means. The storing means can be implemented by a control means such as a computer usually installed in the control station, and the function is carried out by the control means.

The mobile station as the present embodiment has a function to calculate the long code phase difference information, and a cell search function as will be described later. The long code phase difference information calculating function is described in detail in, for example, Volume 3, "Specification of Air-Interface for 3G Mobile System Ver. 1.0", Association of Radio Industries and Businesses (ARIB), Jan. 14, 1999.

Figure 15:
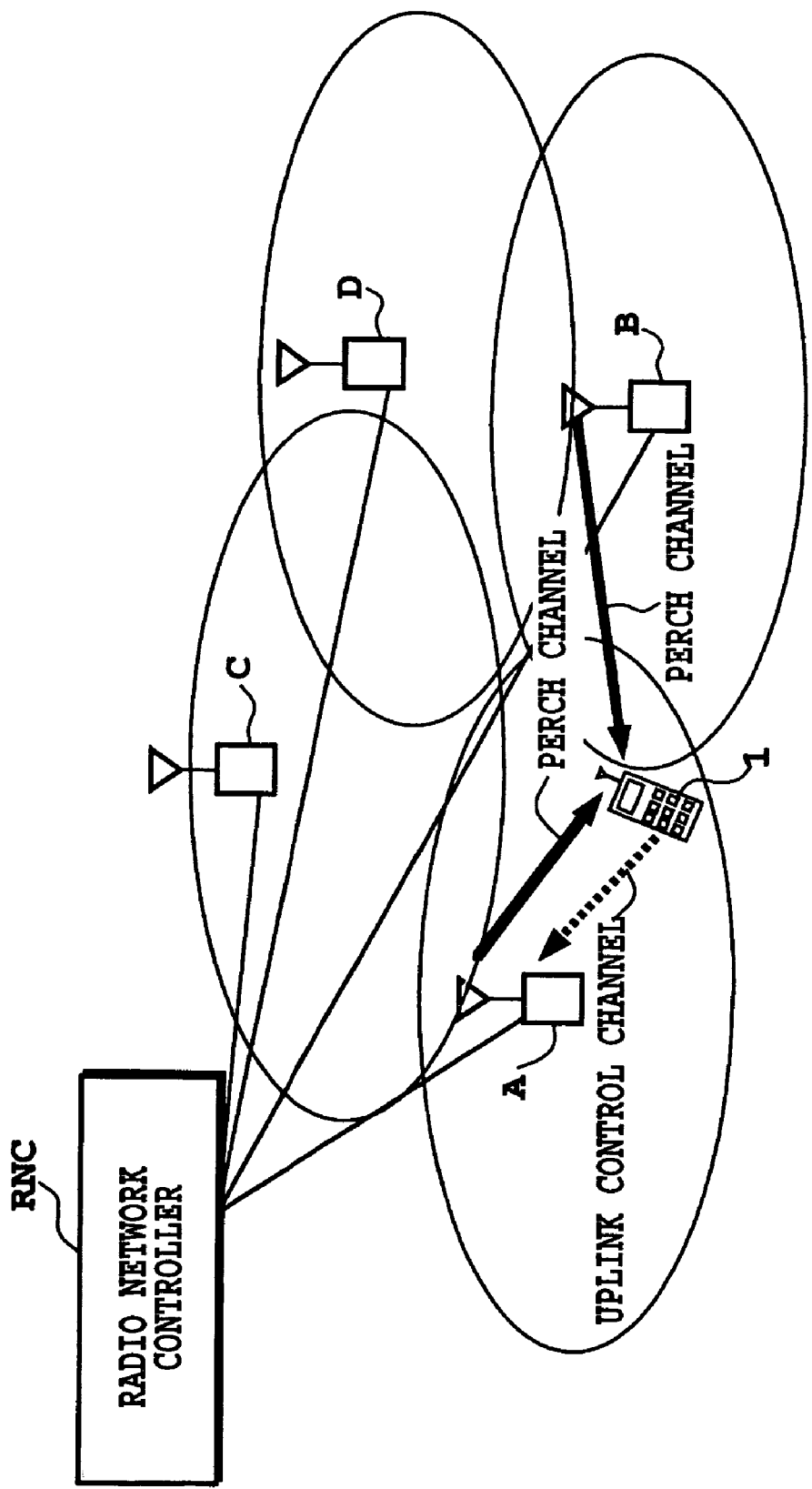
FIG. 15 is a diagram illustrating a procedure for storing long code phase difference information in a second embodiment in accordance with the present invention.

FIG. 15 is a diagram illustrating a procedure for storing long code phase difference information in the present embodiment.

Consider the case where the mobile station 1 makes soft handover (SHO) from a base station A to a base station B. The mobile station 1 measures the difference between the long code phase of the perch channel of the handover-source base station A and the long code phase of the perch channel of the handover-destination base station B at the soft handover, and notifies the handover-source base station A of the measured long code phase difference information via the control channel.

The base station A captures the long code phase difference information via the control channel and stores it in the storing means, where the long code phase difference information is the difference between the long code phase of the perch channel of the handover-source base station A and the long code phase of the perch channel of the handover-destination base station (any one of the base stations B, C and D in FIG. 15), which each mobile station communicating with the base station A measures during the soft handover. Each of the remaining base stations (B, C and D in FIG. 15) also captures the long code phase difference information via the control channel and stores it in the storing means, where the long code phase difference information is the difference between the long code phase of the perch channel of the handover-source base station and the long code phase of the perch channel of the handover-destination base station, which each mobile station communicating with the base station measures during the soft handover.

Accordingly, all the base stations store in their storing means the long code phase difference information, that is, the difference between the long code phase of the perch channel of the handover-source base station and the long code phase of the perch channel of the handover-destination base station, which each mobile station communicating with the base station measures during the soft handover. Here, when a plurality of mobile stations, which communicate with the base station A via radio links interconnecting them, make soft handover to the base station B, the phase differences between the long code phases of the perch channels of the two base stations, which are measured by the respective mobile stations, can differ because of the difference in propagation delay at the measuring positions. Thus, the base station A can average the phase differences between the long code phases of the perch channels of the base station A and base station B sent from the plurality of mobile stations, and obtain the average long code phase difference information, that is, the average phase difference information between the long code phases of the perch channels between the base station A and base station B. The average long code phase difference information can be updated every time each mobile station reports the phase difference information between the long code phases of the perch channels of the base station A and base station B. The base station A updates the long code phase difference information between it and the neighboring base stations. Furthermore, each base station notifies the control station (radio network controller RNC) of the stored long code phase difference information between it and the neighboring base stations via a wired network or the like. Each base station can obtain the long code phase difference information between it and the neighboring base stations from the control station via the wired network or the like. In addition, according to the information stored in the storing means, the base station or the control station can establish ranking of the neighboring base stations as needed in accordance with the number of times of the handover each mobile station communicating with the base station carries out to the neighboring base stations of the base station, during a predetermined interval from the present to the past.

FIG. 16 illustrates an example of the management table in the storing means of the base station or control station. In this table, (1101001100 . . . ) in the column of the long codes of the neighboring base stations represents a long code of a neighboring base station (base station B, for example); and Δ1 in the column of the long code phase difference information represents a measured value (measured by a mobile station) of the long code phase difference between the current station (base station A, for example) and a particular base station (base station B, for example).

Figure 17:
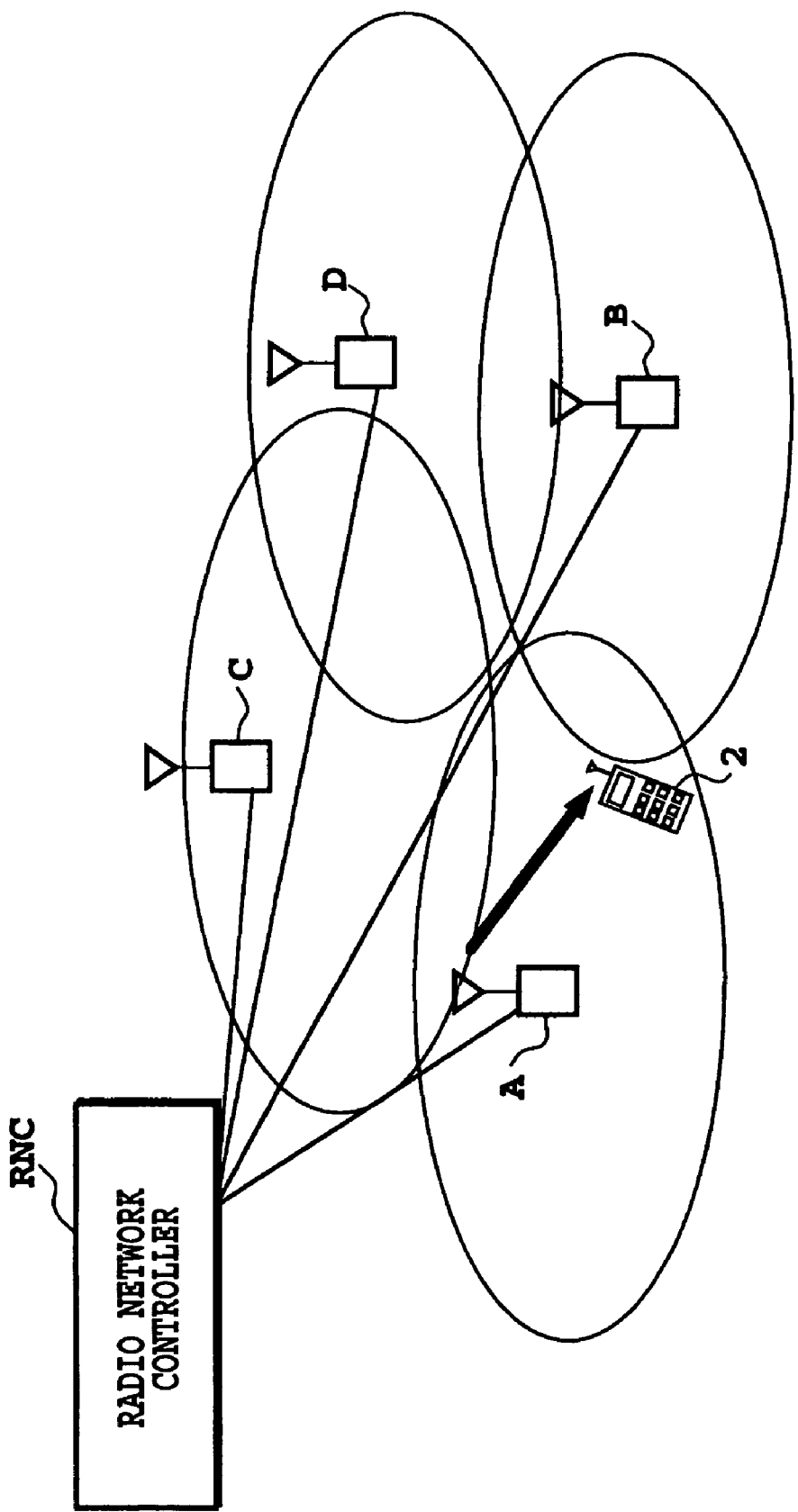
FIG. 17 is a diagram illustrating a manner in which a base station sends the long code phase difference information to a mobile station in the second embodiment in accordance with the present invention.

FIG. 17 is a diagram illustrating a manner in which the base station sends the long code phase difference information to the mobile station in the second embodiment.

When the mobile station 2 communicating with the base station A via a radio link interconnecting them enters a standby mode thereafter, or makes soft handover to another base station, the base station A notifies the mobile station 2 of the long code phase difference information the base station A possesses (stored in the storing means), that is, the relative phases (delay times) of the long codes of the perch channels of all the neighboring base stations with respect to that of the base station A.

Thus, in the standby mode, the mobile station 2 can obtain the long code phase information of the perch channels of the base station A with which the mobile station 2 communicated last and of the N neighboring base stations to which the base station A sends the relative phases of the downlink long codes. As a result, the mobile station in the standby mode can carry out, for the long code phases of the informed perch channels of the N base stations, the long code synchronization and received level detection of the perch channels within a range of search windows, making it possible to carry out the cell search in a very short time.

Likewise, in the cell search for the neighboring base stations involved in entering the soft handover mode, the mobile station can carry out the long code synchronization and received level detection of the neighboring base stations in a very short time by searching for the relative downlink long code phases of the neighboring base stations sent from the handover-source base station, within the range of the search windows.

Providing the long code phase information about the base station with which the mobile station communicated last and N neighboring base stations in the standby mode, or about the neighboring base stations in the soft handover is equivalent to the fact that the long code is shifted at fixed intervals along the time axis in the inter-base station synchronous system, and that the mobile station knows the long code phase timings shifted at every fixed intervals. Therefore, the fast cell search can be implemented nearly equal to that of the inter-base station synchronous system in the standby mode and soft handover mode.

A concrete cell search method in the standby mode and soft handover mode will now be described in more detail. In the standby mode, a different cell search process is taken according to the relationship between numbers Ns and Nc, where Ns is the number of the base station candidates which undergo the cell search in the standby mode, and were notified from the base station (connected via the radio link) immediately before the mobile station entered the standby mode, via the control channel (the base station having its traffic channel connected has the long code information about these base stations), and Nc is the number of neighboring base stations whose relative phase information about the downlink long codes are possessed by the base station and which were notified from the base station. Since the cell search when entering the soft handover mode is similar, only the cell search in the standby mode will be described below.

Figure 18:
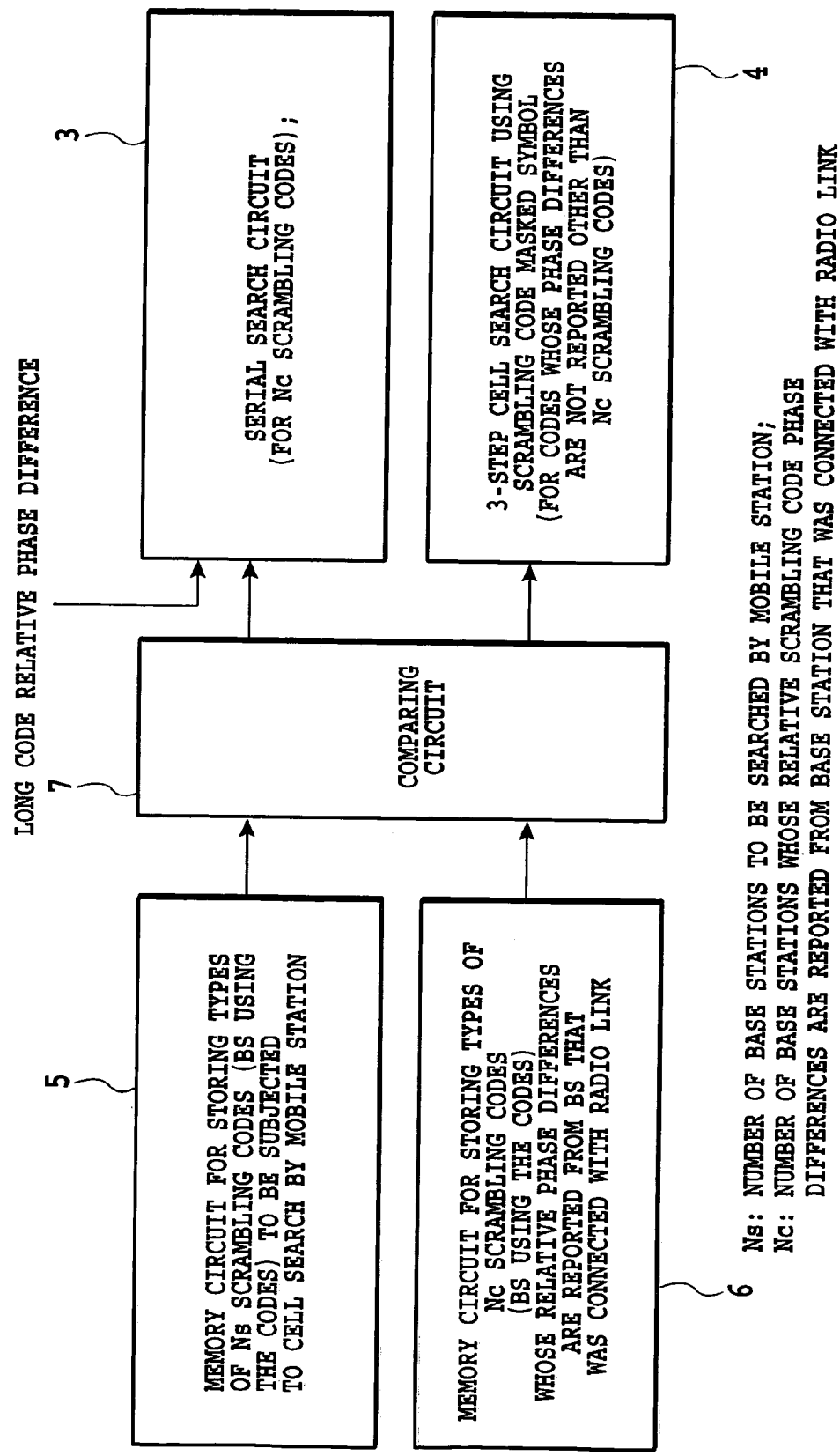
FIG. 18 is a block diagram showing a configuration of a portion implementing a cell search function in the mobile station in the second embodiment in accordance with the present invention.

FIG. 18 shows a configuration of the section for carrying out the cell search function in the mobile station. In FIG. 18, the reference numeral 3 designates a first cell search circuit for carrying out a first cell search function described later; 4 designates a second cell search circuit for carrying out a second cell search function described later; 5 designates a first memory circuit for storing predetermined Ns scrambling codes for which the mobile station carries out the cell search, that is, the types of the long codes (base stations (BS) utilizing the long codes); 6 designates a second memory circuit for storing the types of scrambling codes, that is, the long codes of the base stations (or the base stations using the long codes) that correspond to the relative phase differences of the Nc scrambling codes (long codes) notified from the base station establishing the radio link connection, and that undergo the cell search; and 7 designates a comparing circuit. The comparing circuit 7 compares information in the two memory circuits 5 and 6 to make a decision as to the relationship between the Nc and Ns provided from the base station communicating before entering the standby mode, whether Nc equals Ns (first case), Nc is greater than a predetermined few but less than Ns (second case), or Nc is less than the predetermined few (third case). In response to the decision result, it selects one of the first cell search circuit 3 and second cell search circuit 4 to have it carry out the cell search.

In the first case, the comparing circuit 7 selects the first cell search circuit 3. When Nc equals Ns, the mobile station has information about the types of the long codes and their relative phase information of all the base stations to be searched. Thus, the first cell search circuit 3 can carry out the synchronization detection of the spreading codes of the downlink perch channels and the received level detection for respective phase timings within the range of the search windows.

In the second case, the first cell search circuit 3 is selected so that for the Nc base stations whose information about the types of the long codes and their relative phase information are possessed by the mobile station, the circuit 3 carries out the synchronization detection of the spreading codes of the downlink perch channels and the received level detection for respective phase timings within the range of the search windows. Subsequently, the second cell search circuit 4 is selected so that for the neighboring base stations whose relative phase information about the long codes is not held by the base station connected to the traffic channel, the circuit 4 carries out the 3-step downlink spreading code synchronization detection and received level detection which will be described later (the 3-step downlink spreading code synchronization detection and received level detection is described in, for example, international publication No. WO97/33400 and Japanese patent application laid-open No. 11-196460).

In the third case, the second cell search circuit 4 is selected so that for the neighboring base stations whose relative phase information about the long codes is not held by the base station connected to the traffic channel, the circuit 4 carries out the 3-step downlink spreading code synchronization detection and received level detection which will be described later.

The first cell search circuit 3 carries out the following processing for each base station whose relative phase information about the long code is delivered to the mobile station. It generates a spreading code replica within a fixed time interval (within the search window) of the received timing of the long code; carries out a one-symbol integral with the sliding correlator using the spreading code replica; and detects the received power of the perch channel of the base station from the correlation power obtained by averaging the integrated correlation peaks over several symbols.

In the 3-step cell search disclosed in the international publication No. WO97/33400 and Japanese patent application laid-open No. 11-196460, the perch channel is doubly spread using the short code common to all the base stations and the long code proper to the base station, in which the long code is removed (masked) by one symbol each slot at the fixed intervals. In the "Specification of Air-Interface for 3G Mobile System, Version 1.0" published by ARIB on Jan. 14, 1999, the common short code at which the long code is masked is called a First Search Code (FSC). In addition, all the long codes to be searched for, which are specific to the system are grouped in advance, and a short code representing the group (which is called a Second Search Code (SSC)) is code multiplexed into the FSC. In the "Specification of Air-Interface for 3G Mobile System, Version 1.0", 16 SSCs in one frame are assigned 32 code patterns generated by Reed-Solomon coding so that the group detection and frame timing detection can be achieved at the same time.

The second cell search circuit 4 carries out the cell search using the 3-step cell search described in international publication No. WO97/33400 and Japanese patent application laid-open No. 11-196460, for the base stations whose relative phase information about the long codes are not delivered (the base stations whose long code phase information is not held by the base station connected to the traffic channel). In the first step, a maximum peak is detected by averaging the power of the correlation peaks over an integer multiple of the slots by the matched filter using the FSC as the spreading code replica, and the timing of the peak is adopted as the received timing of the FSC of the base station to be searched. In the second step, the correlation detection is carried out at the timing for each SSC of the 32 groups so that the long code group and frame timing are detected from the group whose correlation peak obtained by averaging over several frames is maximum. Finally, in the third step, the correlation detection is carried out sequentially by the sliding correlator for the long codes belonging to the group detected in the second step so that the long code is identified by making the threshold value decision for the correlation peak.

As described above, according to the present invention, the inter-base station asynchronous system can implement fast cell search comparable to that of the inter-base station synchronous system in the standby mode and soft handover mode.

The invention claimed is:

1. An information management method for cell search in a mobile communications system comprising:

a capturing step of capturing, in a handover-source base station, phase difference information between a long period spreading code of a common control channel from said handover-source base station and a long period spreading code of a common control channel from a handover-destination base station, the phase difference information being calculated by at least one mobile station that is communicating with said handover-source base station;

a storing step of storing, in said handover-source base station and/or its control station, the captured phase difference information; and a transmitting step of transmitting the stored phase difference information to a mobile station.

2. An information management method for cell search in a mobile communications system comprising:

a capturing step of capturing, in a handover-source base station, phase difference information between a long period spreading code of a common control channel from said handover-source base station and a long period spreading code of a common control channel from a handover-destination base station, the phase difference information being calculated by at least one mobile station that is communicating with said handover-source base station; and a storing step of storing, in said handover-source base station and/or its control station, the captured phase difference information, wherein said storing step stores, in said handover-source base station and/or its control station, an average of a plurality of pieces of the phase difference information between the long period spreading code of the common control channel from said handover-source base station and the long period spreading code of the common control channel from said handover-destination base station, the plurality of pieces of the phase difference information being captured from a plurality of mobile stations that are communicating with said handover-source base station.

3. The information management method for cell search in a mobile communications system as claimed in claim 1, further comprising:

a supplying step of supplying, from a control station that stores the phase difference information to said base station, the phase difference information between said base station and its neighboring base stations from among the phase difference information stored.

4. A cell search method of a mobile station comprising:

a receiving step of receiving, from a base station, phase difference information between a long period spreading code of a common control channel of said base station and a long period spreading code of a common control channel of a neighboring base station of said base station; and a cell search step of carrying out cell search in accordance with the received phase difference information.

5. The cell search method of a mobile station as claimed in claim 4, wherein the cell search step carries out the cell search within a fixed time range in accordance with the received phase difference information.

6. A base station comprising:
   storing means for storing phase difference information between a long period spreading code of a common control channel of said base station and a long period spreading code of a common control channel of a neighboring base station of said base station, the phase difference information being captured from a mobile station; and
   management means for managing the phase difference information stored in said storing means.

7. A base station comprising:
   storing means for storing phase difference information between a long period spreading code of a common control channel of said base station and a long period spreading code of a common control channel of a neighboring base station of said base station, the phase difference information being supplied from a control station of said base station; and
   management means for managing the phase difference information stored in said storing means.

8. A control station comprising:
   storing means for storing phase difference information between a long period spreading code of a common control channel of a base station controlled by said control station and a long period spreading code of a common control channel of a neighboring base station of said base station, the phase difference information being captured from said base station it controls; and
   management means for managing the phase difference information stored in said storing means.

9. A mobile station comprising:
   phase difference information storing means for storing phase difference information between a long period spreading code of a common control channel of a base station and a long period spreading code of a common control channel of a neighboring base station of said base station, the phase difference information being captured from said base station; and
   cell search means for carrying out cell search in accordance with the phase difference information stored in said storing means.

10. The mobile station as claimed in claim 9, further comprising:
   first long period spreading code type storing means for storing types of long period spreading codes of a predetermined number of base stations to be subjected to the cell search, said mobile station being notified of the types from said base station;
   second long period spreading code type storing means for storing types of long period spreading codes of the base stations to be subjected to the cell search, the types corresponding to the phase difference information, and said mobile station being notified of the types from said base station; and
   comparing means for comparing information stored in said first long period spreading code type storing means with information stored in said second long period spreading code type storing means,
   wherein said cell search means carries out the cell search in accordance with the phase difference information in response to a compared result by said comparing means.

11. A mobile communications system including a base station and a mobile station,
   said base station comprising:
      base station storing means for storing phase difference information between a long period spreading code of a common control channel of said base station and a long period spreading code of a common control channel of a neighboring base station of said base station, the phase difference information being captured from said mobile station; and
      management means for managing the phase difference information stored in said storing means, and
   said mobile station comprising:
      mobile station storing means for storing the phase difference information captured from said base station; and
      cell search means for carrying out cell search in accordance with the phase difference information stored in said mobile station storing means.

12. A mobile communications system including a base station, a control station for controlling the base station, and a mobile station,
   said control station comprising:
      control station storing means for storing phase difference information between a long period spreading code of a common control channel of said base station and a long period spreading code of a common control channel of a neighboring base station of said base station, the phase difference information being captured from said base station; and
      control station management means for managing the phase difference information stored in said control station storing means,
   said base station comprising:
      base station storing means for storing the phase difference information supplied from said control station; and
      base station management means for managing the phase difference information stored in said base station storing means, and
   said mobile station comprising:
      mobile station storing means for storing the phase difference information captured from said base station; and
      cell search means for carrying out cell search in accordance with the phase difference information stored in said mobile station storing means.

13. The information management method for cell search in a mobile communications system as claimed in claim 2, further comprising:
   a supplying step of supplying, from a control station that stores the phase difference information to said base station, the phase difference information between said base station and its neighboring base stations from among the phase difference information stored.

14. An information management method for cell search m a mobile communications system comprising:
   a capturing step of capturing, in a handover-source base station phase difference information between a long period spreading code of a common control channel from said handover-source base station and a long period spreading code of a common control channel from a handover-destination base station the phase difference information being calculated by at least one mobile station that is communicating with said handover-source base station; and
   a storing step of storing, in said handover-source base station and/or its control station, the captured phase difference information, wherein said storing step stores, in said handover-source base station and/or its control station, a value generated statistically from a plurality of pieces of the phase difference information between the long period spreading code of the common control channel from said handover-source base station and the long period spreading code of the common control channel from said handover-destination base station, the plurality of pieces of the phase difference information being captured from a plurality of mobile stations that are communicating with said handover-source base station.

* * * * *